(12) United States Patent
Ellis et al.

(10) Patent No.: US 10,005,383 B2
(45) Date of Patent: Jun. 26, 2018

(54) METHOD AND APPARATUS FOR TRANSPORTING A TANK

(71) Applicant: Vertical Tank, Inc., Bakersfield, CA (US)

(72) Inventors: Travis Ellis, Bakersfield, CA (US); Brandon Martinez, Bakersfield, CA (US)

(73) Assignee: Vertical Tank, Inc., Bakersfield, CA (US)

( * ) Notice: Subject to any disclaimer, the term of this patent is extended or adjusted under 35 U.S.C. 154(b) by 0 days. days.

(21) Appl. No.: 15/269,480

(22) Filed: Sep. 19, 2016

(65) Prior Publication Data

US 2018/0079347 A1     Mar. 22, 2018

(51) Int. Cl.
| | |
|---|---|
| *B60P 3/22* | (2006.01) |
| *B60P 1/16* | (2006.01) |
| *B60P 1/52* | (2006.01) |

(52) U.S. Cl.
CPC .............. *B60P 3/2245* (2013.01); *B60P 1/16* (2013.01); *B60P 1/52* (2013.01)

(58) Field of Classification Search
CPC .. B60P 3/2245; B60P 1/52; B60P 1/16; B60P 1/165; B60P 1/04; B60P 1/64
USPC .................................................. 414/481–484
See application file for complete search history.

(56) References Cited

U.S. PATENT DOCUMENTS

| | | | | |
|---|---|---|---|---|
| 2,606,676 | A * | 8/1952 | Dempster | B60P 1/64 298/22 D |
| 3,687,319 | A * | 8/1972 | Adam | B60P 1/483 414/467 |
| 4,415,300 | A * | 11/1983 | Boddicker | A01D 90/083 298/20 R |
| 4,621,972 | A * | 11/1986 | Grotte | B60P 1/64 280/414.5 |
| 4,626,166 | A * | 12/1986 | Jolly | B60P 1/64 298/19 R |
| 4,806,061 | A * | 2/1989 | Fenton | B60P 1/52 280/149.2 |
| 7,802,958 | B2 * | 9/2010 | Garcia | B60P 1/52 414/482 |
| 9,428,094 | B2 * | 8/2016 | Herman | B60P 1/6427 |
| 2002/0000748 | A1 * | 1/2002 | Fuller | B60P 3/2245 298/17 R |
| 2009/0220325 | A1 * | 9/2009 | Berney | B60P 1/6454 414/494 |

(Continued)

*Primary Examiner* — Kaitlin S Joerger
(74) *Attorney, Agent, or Firm* — Matthew C. McCartney, Esq.; Eastman & McCartney LLP

(57) ABSTRACT

The present invention is a tank transport system having a hydraulic tilt tank trailer and a vertical tank. The hydraulic tilt tank trailer includes a utility trailer and a tilt chassis having a tilt chassis frame, where tilt chassis is rotatably attached to the utility trailer. A hydraulic lift system is used to provide the mechanical force to tilt, or rotate, the tilt chassis. The vertical tank includes a hollow body supported by a base frame and a sled frame. To load the vertical tank, the vertical tank is positioned to rest on the sled frame and tilt chassis is tilted from the towing position to the loading/unloading position. The vertical tank is pulled onto the tilt chassis where only the sled frame is in contact with the tilt chassis. The tilt chassis is then tilted, or rotated, back into the towing position for transportation.

10 Claims, 24 Drawing Sheets

(56) References Cited

U.S. PATENT DOCUMENTS

2010/0215466 A1* 8/2010 Cline .................... B60P 1/6427
 414/495
2014/0169920 A1* 6/2014 Herman ................ B60P 1/6427
 414/483
2016/0001690 A1* 1/2016 Penner ...................... B60P 1/16
 414/483

* cited by examiner

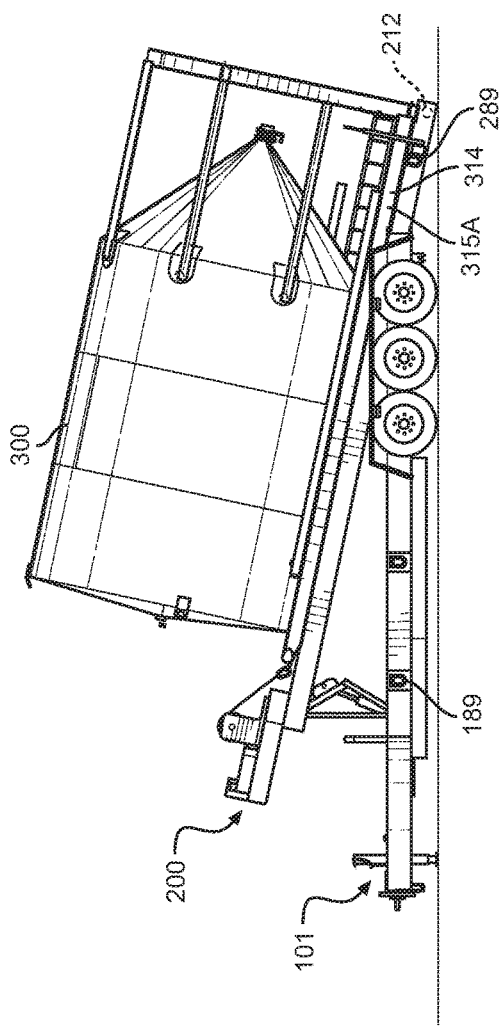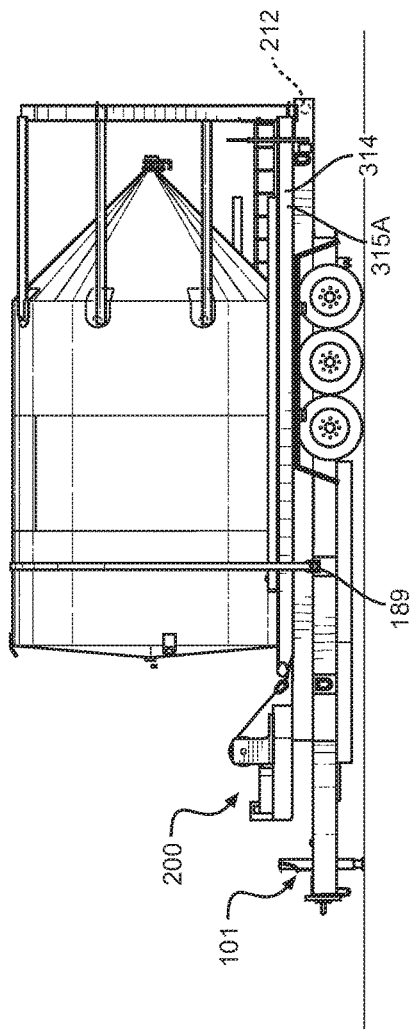

METHOD AND APPARATUS FOR TRANSPORTING A TANK

FIELD OF INVENTION

The present invention relates generally to a method and apparatus for transporting tanks. The present invention is more particularly, but not exclusively, related to a tank transporting system. The present invention is more particularly, but not exclusively, related to a tractor trailer for transporting tanks.

BACKGROUND OF THE INVENTION

The use of fluids to facilitate drilling and extraction is well known in the oil and gas industry. Fluid storage facilities are needed on-site to provide a store of fluid for applications such as hydraulic drilling and fracking. Steel industrial tanks are often used to store drilling fluid or mud because they are robust with long life spans. These storage tanks can be horizontal or vertical. However, whether horizontal or vertical, these steel industrial storage tanks are large and are difficult to transport. In addition, the popularity of vertical tanks is increasing because they occupy less land space compared to a horizontal tank of identical interior volume.

Ordinarily, large steel industrial tanks are transported by loading them onto a large tractor-trailer through the use of a crane or similar lifting device and towed to the destination. Often the tanks are delivered to remote sites that do not have a crane available to lift the tanks from the trailer. The suppliers of tanks are then required to haul the trailer with a semi-tractor truck equipped with a crane. The requirement for such a specialized tractor truck that is equipped with a crane increases the weight of the tractor-trailer that lowers fuel efficiency, which increases the cost of tank delivery. Unloading steel industrial tanks from a large tractor trailer is challenging and requires either using a crane to lift the tank off the trailer or using a winch to pull the tank off of the trailer, causing needless wear and tear on both the tank and the trailer.

Many businesses rent these tanks as opposed to purchasing them outright. The tanks are stored in a central location. Then when rented, the tanks are transported from the central location to a work site for a particular drilling operation and then collected upon completion of drilling operations and transported back to the central location. Thus, there is a need to deliver and collect the tanks as quickly and efficiently as possible.

When tanks are delivered to a remote location, the rental company faces large fuel costs for a variety of reasons. First, the delivery company incurs large fuel costs by transporting tanks with tractor-trailers. Second, the delivery company incurs a loss of fuel economy by either separately delivering a crane system, or utilizing a semi-tractor truck equipped with a crane system. Third, the delivery company incurs a loss of fuel economy upon the return trip for hauling a heavy unloaded trailer and crane (either on the truck itself or by way of a separate vehicle).

Collecting a tank suffers from similar efficiency problems for a rental company. First, the rental company has to haul an empty trailer to the particular location of the tank using a tractor. In addition, the rental company has to deliver a crane to the tank location in order to place the tank on the trailer. Finally, the rental company has to make the return trip to the central location including both the trailer and the crane.

In light of the above, it would be advantageous to provide a tank transport system and method for transporting industrial tanks in such a way to not use a tractor-trailer. It would further be advantageous to provide a tank transport system and method to transport and deliver a storage tank with the use of a pickup truck or medium duty semi-truck. It would be further advantageous to provide a tank transport system and method to transport and deliver a storage tank without the need for a crane. It would be further advantageous to provide a tank transport system that is low weight. It would be further advantageous to provide a tank transport system and method that has a minimal amount of moving parts to provide for quick loading and unloading of a tank. It would be further advantageous to provide a tank transport system which is easy to use, and relatively cost efficient.

SUMMARY OF THE INVENTION

The present invention is a tank transport system having a hydraulic tilt tank trailer and a vertical tank and a method of transporting the vertical tank using the tank transport system. The vertical tank is secured to the hydraulic tilt tank trailer. By securing the vertical tank to the hydraulic tilt tank trailer, the vertical tank may be towed by a standard truck or medium duty semi-truck, removing the need to utilize a heavy duty semi-truck or a tractor-trailer to tow the vertical tank.

In the preferred embodiment of the invention, the hydraulic tilt tank trailer includes a utility trailer having a trailer bed and a tilt chassis having a tilt chassis frame and utility frame. The trailer bed of the utility trailer includes cross members to increase the strength and stiffness of the frame. Support members are attached to the U-shaped frame to provide a sunken platform to support the tilt chassis. Attached to the trailer bed is the tongue and tow hitch. Alternatively, a goose neck type tow hitch may be utilized. Attached to the trailer bed are a plurality of axles with wheels.

The tilt chassis frame of the tilt chassis includes a U-shaped frame with longitudinal members and cross members to increase the strength and stiffness of the frame. One end of the tilt chassis frame is fitted with main rollers that rotate freely. The top surface of the tilt chassis frame is attached with plates to create a platform. The tilt chassis frame further includes intermediary rollers and skid plates. The skid plates are attached to the surface of the plates and the intermediary rollers are placed between two columns of skid plates. The utility frame is attached to the top of the tilt chassis frame, opposite the end of the rollers. The utility frame provides mounting points for a winch, a utility box, and various other components of the system.

The tilt chassis is rotatably attached to the utility trailer through the tilt chassis frame and the trailer bed. This allows the tilt chassis to tilt, or rotate, about the attachment point to the utility trailer. A hydraulic lift system is attached between the utility trailer and the tilt chassis to provide the mechanical force to tilt, or rotate the tilt chassis.

The vertical tank includes a hollow body for holding liquid supported by a base frame, a sled frame, and support members. In its upright position, the base frame is attached to the bottom of the vertical tank and the sled frame is attached to and runs along the vertical length of the vertical tank. The base frame supports the bottom of the vertical tank when it is upright and the sled frame supports the vertical tank when it is laid on its side.

A preferred method of transporting a tank includes providing a hydraulic tilt tank trailer and a vertical tank. The hydraulic tilt tank trailer is towed to the location of the vertical tank with a truck. Upon reaching the destination, the hydraulic tilt tank trailer is tilted, or rotated, from the towing position to the loading/unloading position. Once in the loading/unloading position the winch wire and fastener is connected to the vertical tank, which is resting on the sled frame on the ground. The winch is then retraced, which pulls the vertical tank towards the tilt chassis. Upon contact with the main rollers of the tilt chassis, the sled frame of the vertical tank rolls over the main rollers and rolls onto the tilt chassis. Once on the tilt chassis, the sled frame of the vertical tank contacts the intermediary rollers and the skid plates. The vertical tank is then pulled until it is completely on the tilt chassis. The tilt chassis is then tilted, or rotated, into the towing position where the tank is then secured to the hydraulic tilt tank trailer. The vertical tank is then ready to be towed to the next destination.

To unload the vertical tank, the straps used, or other securing means, are removed. The winch wire and fastener are attached to the vertical tank. The tilt chassis is then tilted until the main rollers contact the floor. Once the main rollers contact the floor, the winch is slowly released and the vertical tank begins to slide off of the tilt chassis until the base frame and sled frame contact the floor. The winch wire and fastener may be removed from the vertical tank or may be left on until the vertical tank is completely off the hydraulic tilt tank trailer. After the base frame and sled frame of the vertical tank contacts the floor, the hydraulic tilt tank trailer is towed forward. The weight of the vertical tank on the ground provides enough grip so that the vertical tank is not dragged along with the hydraulic tilt tank trailer as it is towed. The hydraulic tilt tank trailer is pulled from under the vertical tank, unloading the vertical tank on the ground to be used. Alternatively, a crane may be utilized to remove the vertical tank from the hydraulic tilt tank trailer after it is in contact with the ground. After unloading the vertical tank, the winch wire is retracted and the tilt chassis is tilted back to the towing position.

BRIEF DESCRIPTION OF THE DRAWINGS

The nature, objects, and advantages of the present invention will become more apparent to those skilled in the art after considering the following detailed description in connection with the accompanying drawings, in which like reference numerals designate like parts throughout, and wherein:

FIG. 3a is a close-up view of the axles of the utility trailer;

FIG. 21 is a side view of the hydraulic tilt tank trailer with the tilt chassis in the loading/unloading position with the vertical tank loaded onto the tilt chassis;

FIG. 22 is a side view of the hydraulic tilt tank trailer with the tilt chassis in the towing position with the vertical tank loaded onto the tilt chassis;

DETAILED DESCRIPTION OF THE INVENTION

Figure 1:
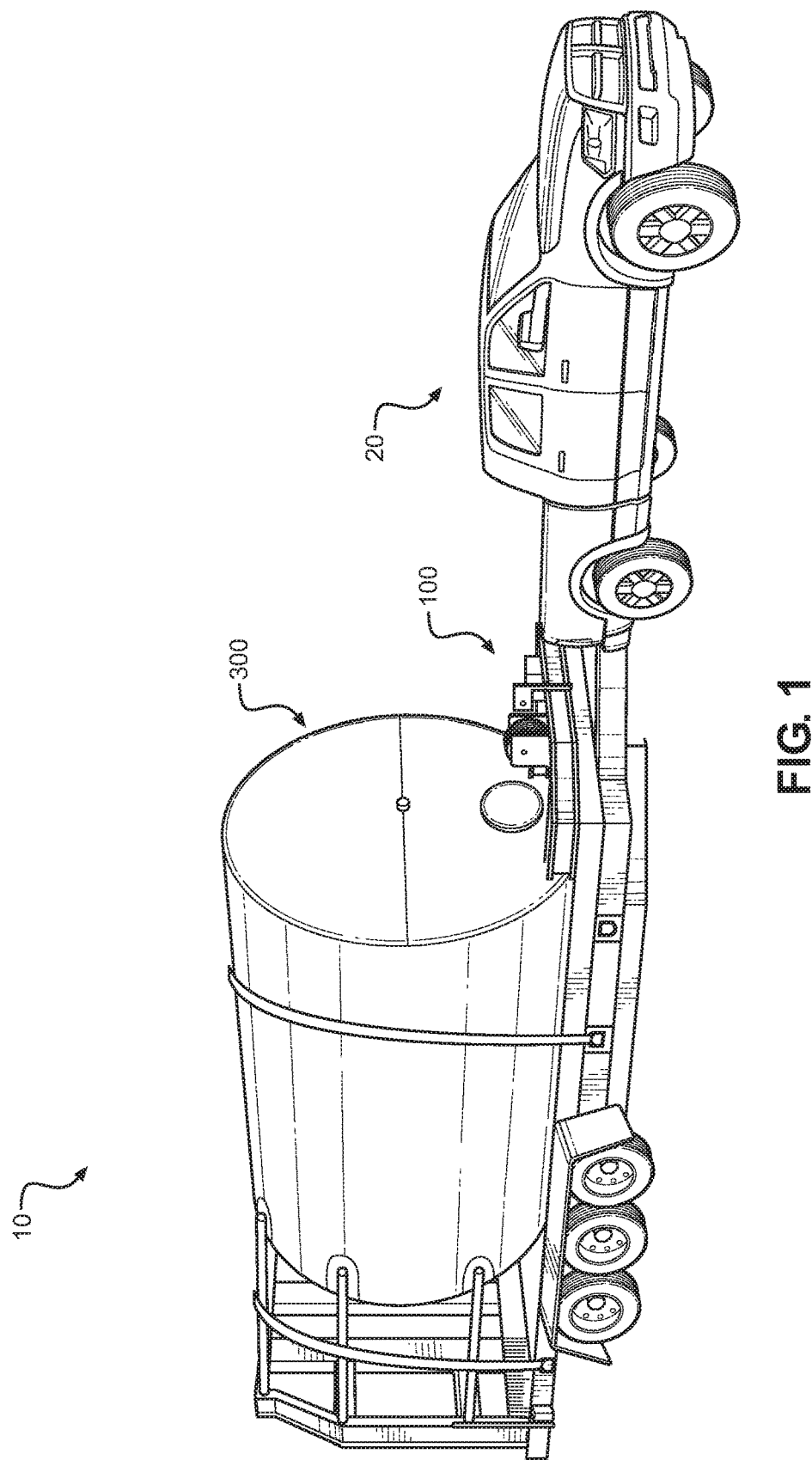
FIG. 1 is a perspective view of a tank transport system having a hydraulic tilt tank trailer and vertical tank being towed by a truck.

Referring initially to FIG. 1, a tank transport system 10 is generally disclosed and includes a truck 20, a hydraulic tilt tank trailer 100, and a vertical tank 300. The vertical tank 300 is secured to the hydraulic tilt tank trailer 100. By securing the vertical tank 300 to the hydraulic tilt tank trailer 100, the vertical tank 300 may be towed by the truck 20, removing the need to utilize a tractor-trailer to tow the vertical tank 300. As shown, the pickup truck 20 is coupled to the hydraulic tilt tank trailer 100 with the vertical tank 300. This saves on fuels cost, saves the need to use oversized tractor-trailers, prevents the need for designated transportation equipment, and provides for easier maneuverability.

Tank Hydraulic Tilt Tank Trailer

Figure 2:
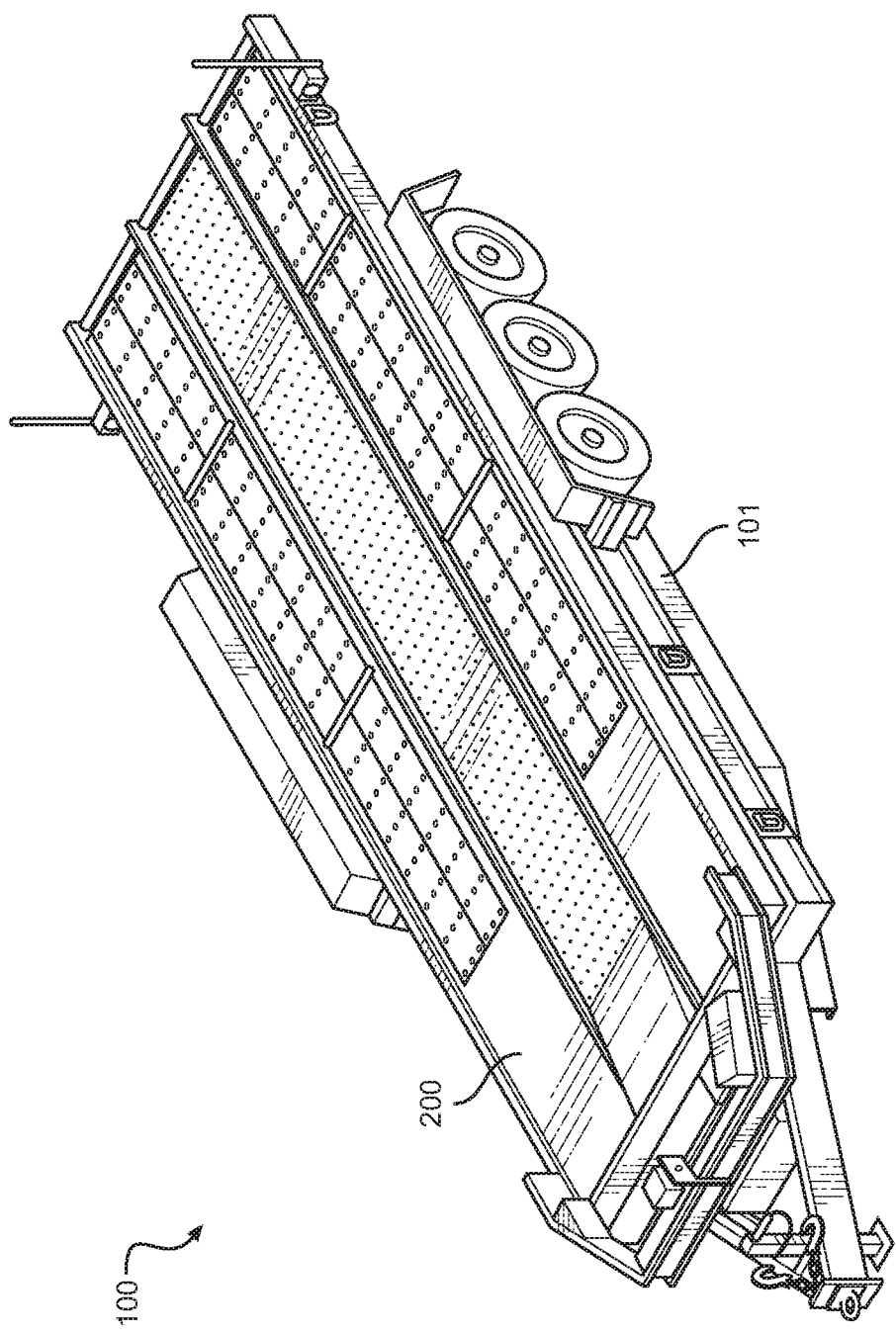
FIG. 2 is a perspective view of a preferred embodiment of the hydraulic tilt tank trailer having a utility trailer and a tilt chassis.

Referring now to FIG. 2, a perspective view of a preferred embodiment of the hydraulic tilt tank trailer 100 is shown. The hydraulic tilt tank trailer 100 includes a utility trailer 101 and a tilt chassis 200. The tilt chassis 200 is rotatably attached to the utility trailer 101 and allows the tilt chassis 200 to rotate about the utility trailer 101. In the preferred embodiment, this allows the tilt chassis 200 to rotate between 0° and 11°. The degrees of rotation are not meant to be limiting, and it is contemplated that the degrees of rotation of the tilt chassis 200 may be more or less.

Figure 3:
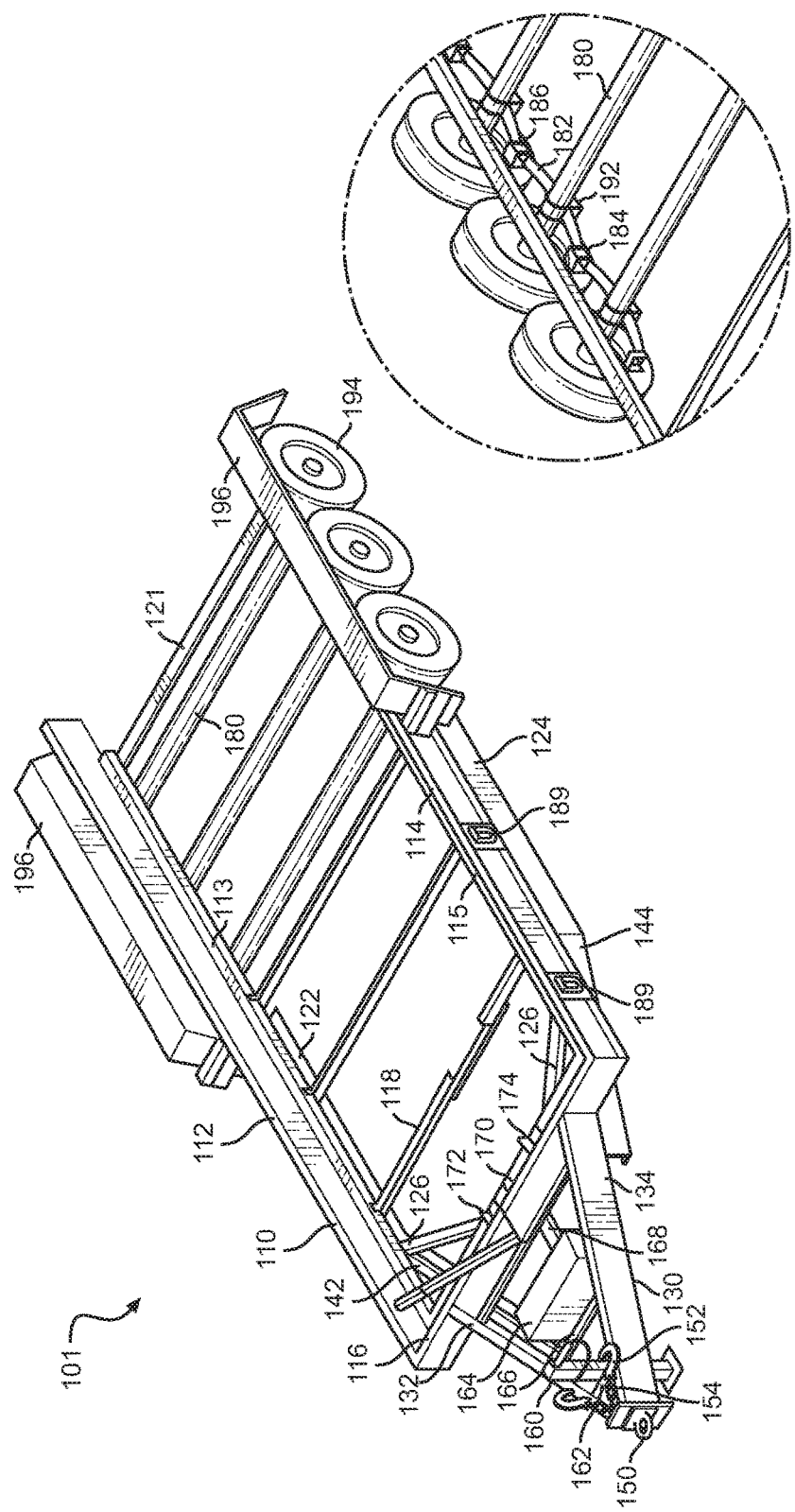
FIG. 3 is a perspective view of the utility trailer.
Figure 10:
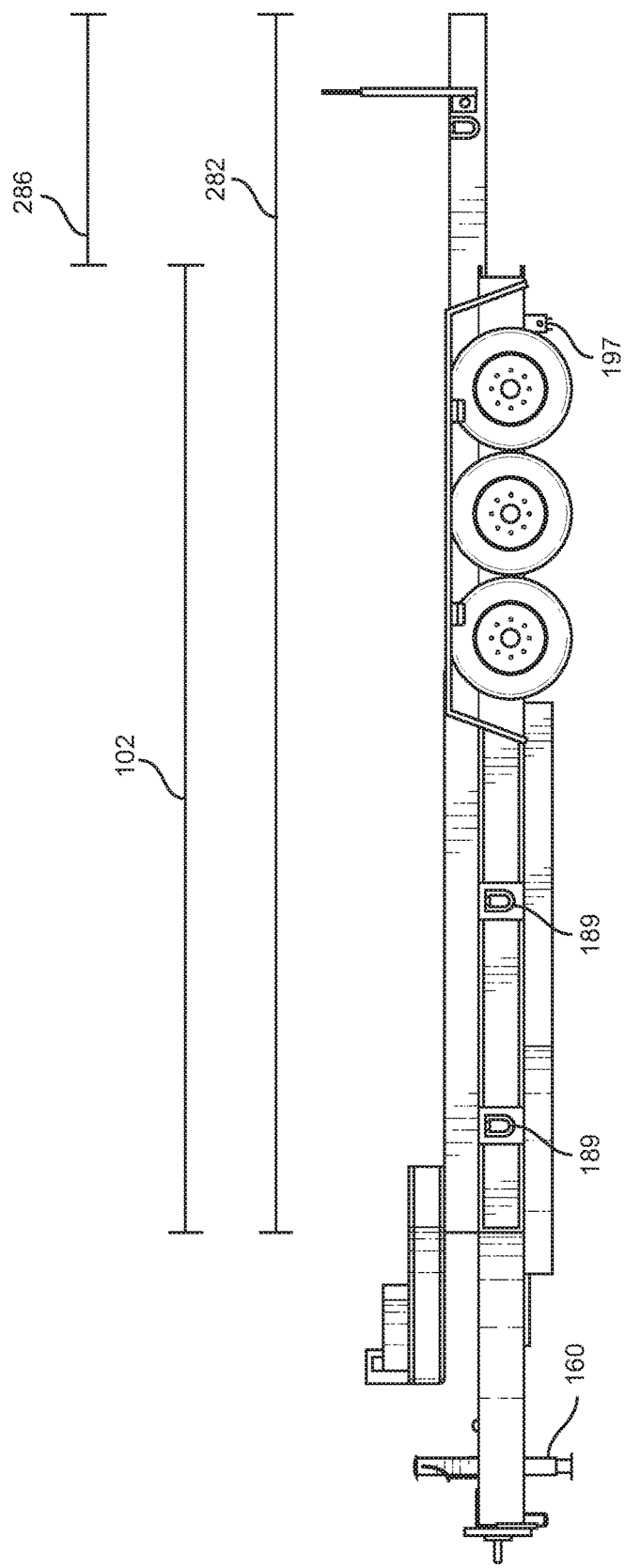
FIG. 10 is a side view of the hydraulic tilt tank trailer in a towing position.

Referring now to FIG. 3, a perspective view of the preferred embodiment of the utility trailer 101 is shown. The utility trailer includes a trailer bed 110 having a first frame member 112, a second frame member 114, and a primary cross member 116 attached between the first frame member 112 and the second frame member 114. Attached between the first frame member 112 and second frame member 114, along the length, are secondary cross members 118 with a rear cross-member 121. The first frame member 112, second frame member 114, and primary cross member 116 create a U-shaped trailer bed frame, where the secondary cross members 118 and rear cross member 121 provide additional strength and stiffness. First bracing 122 is attached adjacent and below first frame member 112 and second bracing 124 is attached adjacent and below second frame member 114 to increase the front end strength of the trailer bed 110. Corner braces 126 are further provided to increase the front end strength and stiffness of the trailer bed 110. A plurality of D-rings 189 is attached around the perimeter of the trailer bed 110 to provide tie down points for use when transporting vertical tank 300. Additionally, jack stands 197 (shown in FIG. 10) are attached to the trailer bed 110 behind the axles 180.

Attached to the primary cross member 116 is a trailer tongue 130. The trailer tongue 130 includes a first tongue member 132 and a second tongue member 134 orientated in a triangular shape, where the base of the triangular shape is the primary cross member 116. At the apex of the tongue 130 is a tow ring 150 and heavy duty chains 154 with tow hook 152. A hitch jack cross member 162 is attached between the first tongue member 132 and the second tongue member 134 and has an attached hitch jack 160. A utility box cross member 166 is attached between the first tongue member 132 and the second tongue member 134 and has an attached utility box 164. A center tongue brace 168 is attached between the utility box cross member 166 and the primary cross member 116. First tongue bracing 142 is adjacent and attached to the bottom of the first frame member 112, primary cross member 116, and first tongue member 132. Second tongue bracing 144 is adjacent and attached to the bottom of the second frame member 114, primary cross member 116, and second tongue member 134.

Attached adjacent to the primary cross member 116, opposite the trailer tongue 130, is a primary support member 170. Attached to the primary support member 170, towards the center, is a first flange 172 and a second flange 174. The first flange 172 and second flange 174 are angled to provide an alignment tool for the tilt chassis 200. Additionally, the first flange 172 and second flange 174 are sized to receive and secure a hydraulic lift system 290 (shown in FIG. 11).

A first support member 113 is attached adjacent the first frame member 112 and above the secondary cross members 118 and rear cross member 121. The second support member 115 (not shown) is attached adjacent the second frame member 114 and above the secondary cross members 118 and rear cross member 121. The primary support member 170, the first support member 113, and the second support member 115 provides an edge along the inner surface of the U-frame created by the first frame member 112, second frame member 114, and primary cross member 116 to create a support platform sized to receive and support the tilt chassis 200 (not shown in FIG. 3).

As shown in FIG. 3a, trailer axles 180 are attached to the rear of the trailer bed 110. In the preferred embodiment, the utility trailer 101 has straight triple axles 180. Each axle 180 is attached to the trailer bed 110 in a substantially similar manner, and therefore only the description of the structure and method of connecting a single axle will be described. The trailer axle 180 is attached to the trailer bed 110 through the use of leaf spring 182, a first front hanger 184, a first rear hanger 186, a second front hanger 188, a second rear hanger 190, a second leaf spring 183 (not shown), and U-bolts 192.

The first frame member 112 has the first front hanger 184 and the first rear hanger 186 attached and spaced a distance apart. The distance allows for the spring leaf 182 to be attached to and in between the first front hanger 184 and the first rear hanger 186.

Similarly, the second frame member 114 has the second front hanger 188 and the second rear hanger 190 attached and spaced a distance apart. The distance allows for the second leaf spring 183 to be attached to and in between the second front hanger 188 and the second rear hanger 190. The axle 180 is then attached to and between the leaf springs 182 and 183 with U-bolts 192. Second leaf spring 183, second front hanger 188 and second rear hanger 190 are omitted from the Figure as they are structurally equivalent to leaf spring 182, first front hanger 184 and first rear hanger 186.

Attached to the axles are wheels 194. Wheel wells 196 are attached to the first frame member 112 and second frame member 114 over the wheels 194. The method of attachment of axles 180 are not meant to be limiting, and various methods of attachment are considered herein.

Figure 4:
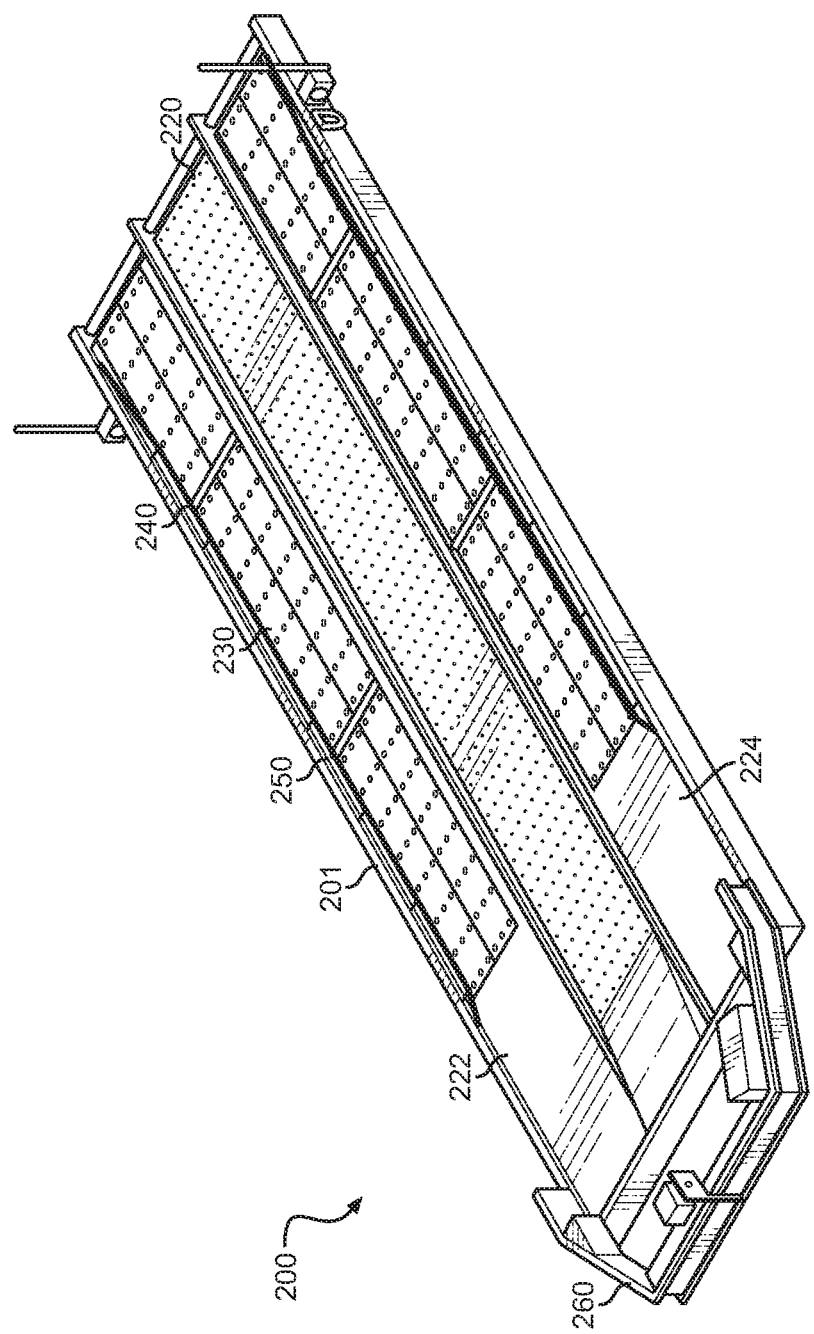
FIG. 4 is a perspective view of the tilt chassis.

Referring now to FIG. 4, a perspective view of a preferred embodiment of the tilt chassis 200 is shown. The tilt chassis 200 includes a tilt chassis frame 201 and a utility frame 260. The tilt chassis frame 201 is covered to create a deck. In FIG. 4, the deck is made up of a combination of right steel deck plates 222 and left steel deck plates 224 on either side of diamond plate 220. The diamond plate 220 is utilized for its raised surface that allows a person to walk without slipping. The right steel plate 222 and left steel plate 224 provide a smooth, flat and even surface for the attachment of various components of the tilt chassis 200 such as the skid plates 230, intermediary rollers 240, and guides 250.

Figure 5:
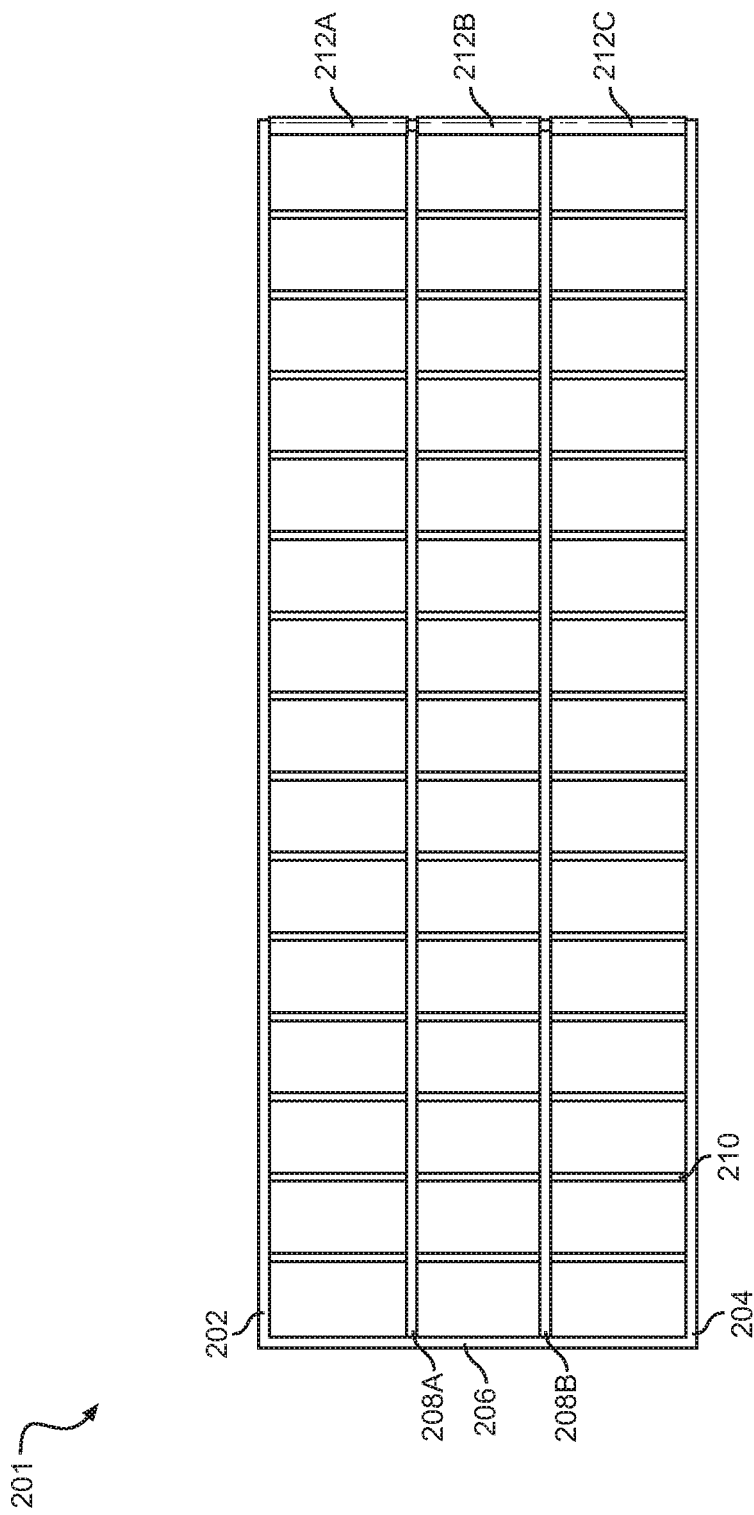
FIG. 5 is a plan view of the tilt chassis frame of the tilt chassis.

Referring now to FIG. 5, a plan view of the tilt chassis frame 201 is shown. The tilt chassis frame 201 includes a first tilt chassis frame member 202, a second tilt chassis frame member 204, and a primary tilt chassis cross member 206 attached between the first tilt chassis frame member 202 and the second tilt chassis frame member 204 to create a U-shaped frame. The first tilt chassis frame member 202, the second tilt chassis frame member 204, and the primary tilt chassis cross member 206 have the same height and width dimensions.

Attached to, and extending perpendicular to the primary tilt chassis cross member 206 is a pair of longitudinal tilt chassis frame members 208A and 208B. The longitudinal tilt chassis frame members 208A and 208B are evenly spaced apart and extend to as long as the first tilt chassis frame member 202 and the second tilt chassis frame member 204. Attached between the first tilt chassis frame member 202 and the longitudinal tilt chassis frame member 208A, between the pair of longitudinal tilt chassis frame members 208A and 208B, and between the second tilt chassis frame member 204 and the longitudinal tilt chassis frame members 208B are a plurality of secondary tilt chassis cross members 210. The longitudinal tilt chassis frame members 208A and 208B and the secondary tilt chassis cross members 210 have the same width and height dimensions, which are smaller than the first tilt chassis frame member 202, the second tilt chassis frame member 204, and the primary tilt chassis cross member 206.

The plurality of secondary tilt chassis cross members 210 are evenly distributed along the length of the tilt chassis frame 201 creating a flat, even surface that is recessed below the surface of the U-shaped frame of the tilt chassis frame 201. The number of longitudinal tilt chassis frame members 208A and 208B and the plurality of secondary tilt chassis cross members 210 shown is not meant to be limiting, and it is contemplated that the number of such members may change based on the specific physical properties of the tilt chassis frame 201 that is needed.

Main rollers 212A, 212B, and 212C (collectively referred to as main rollers 212) are attached to the tilt chassis frame 201 at the opposite end of the primary tilt chassis cross member 206. Roller 212A is attached between the first tilt chassis frame member 202 and the longitudinal tilt chassis frame member 208A. Roller 212B is attached between the pair of longitudinal tilt chassis frame members 208A and 208B. Roller 212C is attached between the second tilt chassis frame member 204 and the longitudinal tilt chassis frame members 208B. It is contemplated that main rollers 212A, 212B, and 212C may instead be replaced with low friction cylindrical members.

Referring back to FIG. 4, the tilt chassis frame 201 is covered with right steel plate 222 in the section of the tilt chassis frame 201 extending between the first tilt chassis frame member 202 and the longitudinal tilt chassis frame member 208A. Similarly, left steel plate 224 covers the section of the tilt chassis frame extending between the second tilt chassis frame member 204 and the longitudinal tilt chassis frame member 208B. Diamond plate 220 extends between the longitudinal tilt chassis frame members 208A and 208B. The right steel deck 222, left steel deck 224, and diamond plate 220 longitudinally extends from the primary tilt chassis cross member 206 to a gap that separates the right steel deck 222, left steel deck 224, and diamond plate 220 from the main rollers 212. This allows the main rollers 212 to rotate freely without interference.

Figure 6:
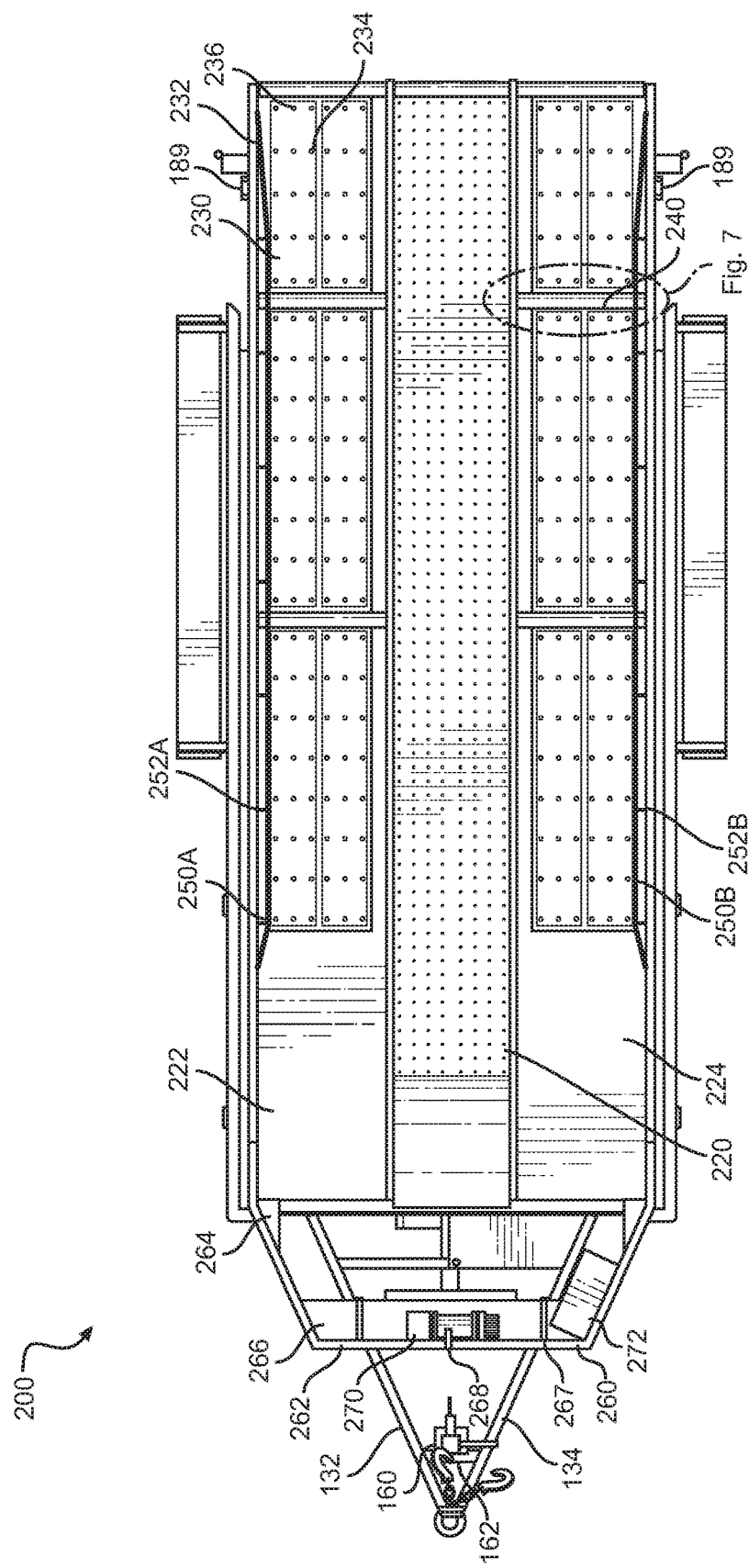
FIG. 6 is a plan view of the tilt chassis frame.

Referring now to FIG. 6, a plan view of the tilt chassis 200 is shown. A plurality of D-rings 189 is attached around the perimeter of the tilt chassis 200 to provide tie down points for use when transporting vertical tank 300. A total of six skid plates 230 are attached to right steel plate 222 and six skid plates 230 are attached to left steel plate 224, for a total of twelve skid plates 230. The skid plates 230 are arranged in the same pattern (two rows and three columns) on the right skid plate 222 and left skid plate 224 respectively. The number and arrangement of skid plates 230 is not meant to be limiting and it is contemplated that the number and arrangement of the skid plates 230 may be modified according to the specification desired.

As the skid plates 230 are each attached in a similar manner to right steel plate 222 and left steel plate 224, the description of a single skid plate 230 and its attachment will be described and will be applicable to all the skid plates 230. Each skid plate 230 includes a skid plate frame 232 attached to the top surface of either the right steel plate 222 or left steel plate 224. The skid plate frame 232 is rectangular shaped with a center separator, creating a skid plate frame 232 having two rectangular sections formed to each receive a corresponding skid plate 230.

The skid plates 230 are formed with a plurality of counterbored holes 234 and are placed within the skid plate frame 232. The skid plates 230 have a larger thickness than the skid plate frame 232 where the skid plates 230 protrudes pass the skid plate frame 232 when the skid plate 230 is inserted. Fasteners 236, as known in the art, are inserted through the counterbored holes 234 to attach the skid plate 230. The counterbored holes 234 allow the fasteners 236 to sit below the top surface of the skid plate 230 at a predetermined distance. The placement of the fasteners 236 below the surface removes any possible interference that may be caused by the fasteners 236 when the vertical tank 300 is pulled along the surface of the skid plate 230, including instances where the skid plate 230 may be worn and the thickness decreased. The fasteners 236 prevent the skid plate 230 from dislodging from the skid plate frame 232 and the skid plate frame 232 in conjunction with the fasteners 236 prevents any lateral movement, particularly when the vertical tank 300 is pulled across the skid plate 230.

First guide rail 250A and second guide rail 250B provide bumpers that center the vertical tank 300 along the trailer 100 as it is pulled onto the trailer 100 as well as to prevent damage to the tilt chassis 201. The first guide rail 250A is an elongated steel stock attached to the first tilt chassis frame member 202 and right steel plate 222 forming a rectangular center section and a tapered front and rear. A plurality of bracing members 252A is attached between the first guide rail 250A and the first tilt chassis frame member 202. The second guide rail 250B is an elongated steel stock attached to the second tilt chassis frame member 204 and left steel plate 224 forming a rectangular center section and a tapered front and rear. A plurality of bracing members 252B is attached between the second guide rail 250B and the second tilt chassis frame member 204.

Figure 7:
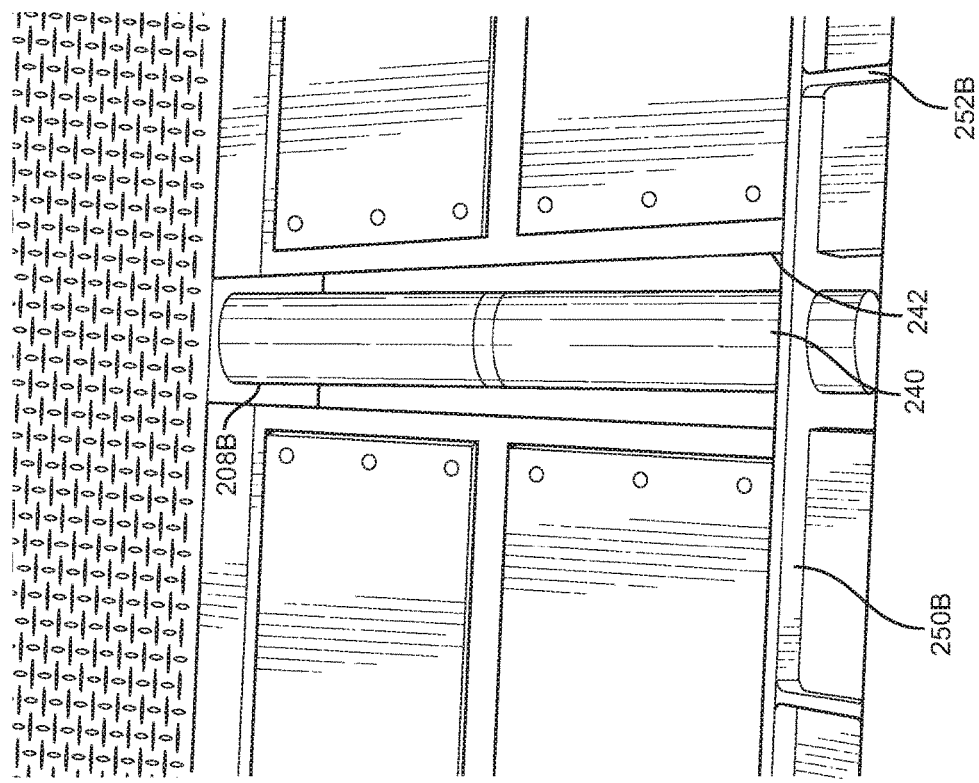
FIG. 7 is a close-up view of the tilt chassis showing the intermediary rollers and skid plates.

Intermediary rollers 240, described in detail in conjunction with FIG. 7, are placed in between each column of skid plates 230. In the preferred embodiment, there are three columns of skid plates 230 per right steel plate 222 and per left steel plate 224 and there are two intermediary rollers 240 for each steel plate 222 and 224, for a total of four intermediary rollers 240. The number and arrangement of intermediary rollers 240 is not meant to be limiting and it is contemplated that the number and arrangement of the intermediary rollers 240 may be modified according to the specification desired. As the intermediary rollers 240 are attached in a similar manner to the right steel plate 222 and left steel plate 224, the description of one intermediary roller 240 and its attachment will be described and will be applicable to all intermediary rollers 240. In an alternative embodiment, no intermediary rollers 240 are utilized and instead only continuous skid plates 230 are used on the right steel plate 222 and the left steel plate 224.

Between two columns of skid plates 230, an intermediary roller housing 242 is formed. The intermediary roller housing 242 is an opening formed in right steel plate 222 or left steel plate 224 that provides open access to the tilt chassis frame 201, including the longitudinal tilt chassis frame member 208A and 208B. The intermediary rollers 240 are attached to and in between the first guide rail 250A and the longitudinal frame member 208A for right steel plate 222. The intermediary rollers 240 are attached to, and in between, the longitudinal frame member 208B and the second guide rail 250B on the left steel plate 224.

Intermediary rollers 240 include a shaft and a bearing. The four major components of the bearings include an inner ring, an outer ring, rollers, and a cage. The shaft is inserted within the bearing and is retained by the inner ring while the outer ring of the bearing rotates about the shaft. The shaft protrudes past the bearing and provides mounting points for the intermediary rollers 240. The description of the intermediary rollers 240 is not meant to be limiting, and it is contemplated that various types of rollers known in the art may be used without departing from the spirit and scope of the invention.

The intermediary rollers 240 are positioned wherein the top surface of the intermediary rollers 240 are above the top surface of the skid plates 230. The intermediary rollers 240 provide a point of contact for the vertical tank 300. This minimizes the friction acting on the vertical tank 300 as it is pulled onto the trailer 100. In instances where the vertical tank 300 may tilt slightly, such as when the vertical tank is only in contact with one set of intermediary rollers 240, the skid plates 230 provide a low-friction surface that allows the vertical tank 300 to skid along until it contacts another set of intermediary rollers 240. When fully mounted, the vertical tank 300 is in contact with only the intermediary rollers 240.

Figure 8:
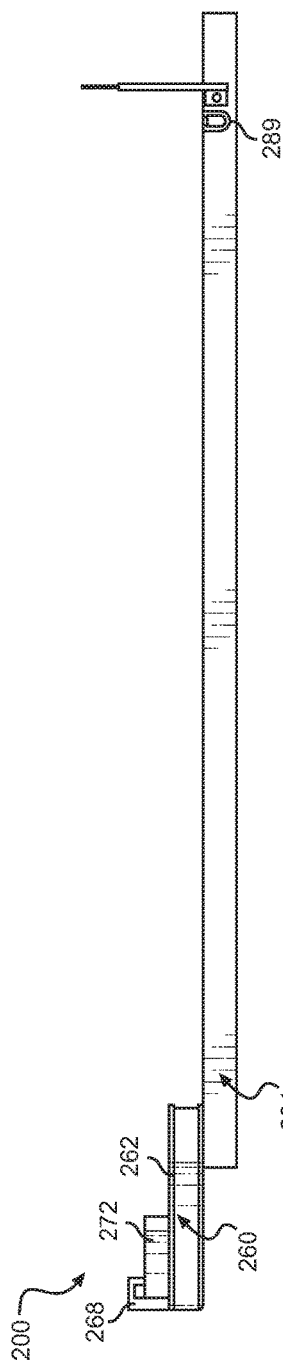
FIG. 8 is a side view of the tilt chassis.
Figure 9:
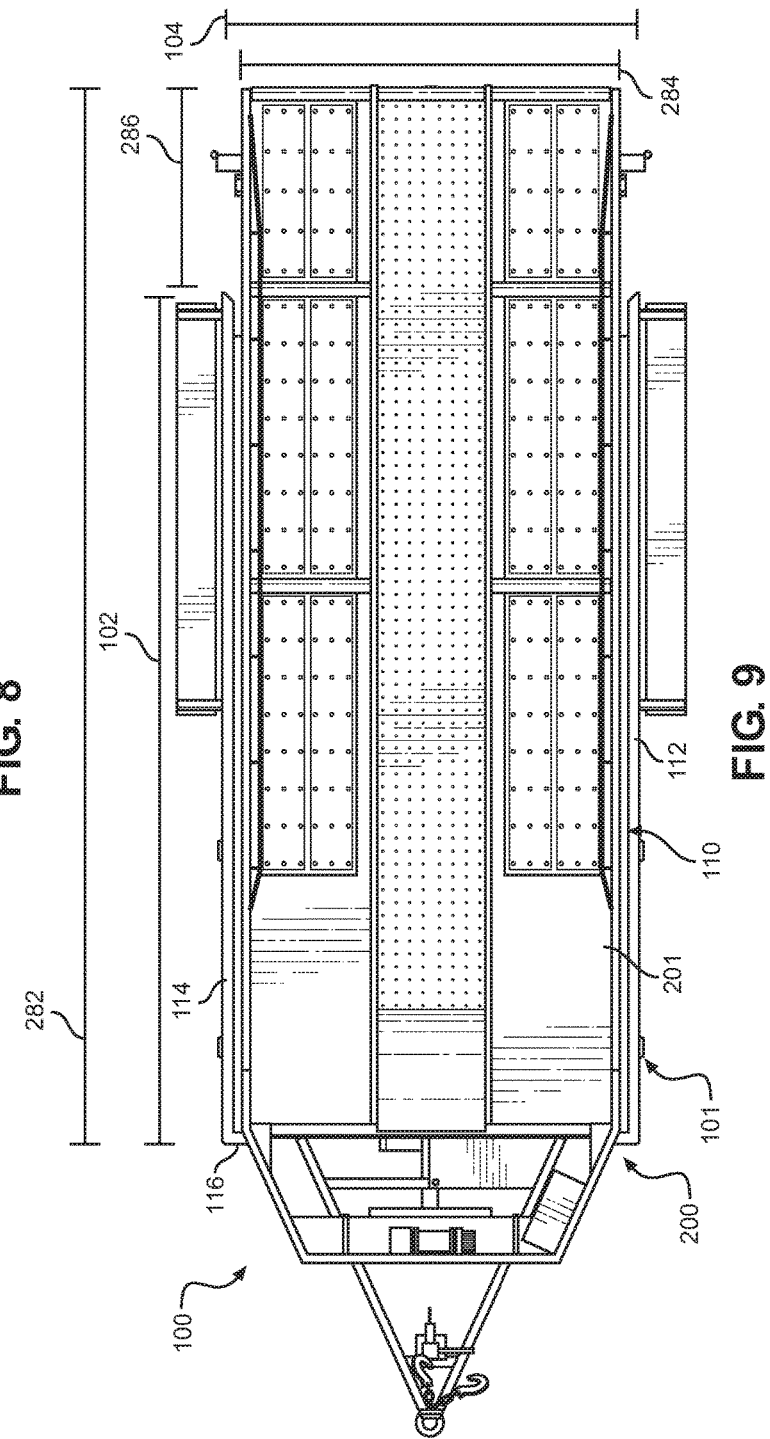
FIG. 9 is a plan view of the hydraulic tilt tank trailer.

The utility frame 260, described in conjunction with FIGS. 4, 6, and 8, is attached to the top of the tilt chassis frame 201. The utility frame 260 includes a utility frame member 262 formed into a shape of a trapezium having an open base with elongated members extending from the base. The elongated members of the trapezium shaped utility frame member 262 are attached to the top surface of the first tilt chassis frame member 202 and the second tilt chassis frame member 204. Gussets 264 are used to attach the utility frame member 262 to the primary tilt chassis cross member 206. A utility base plate 266 is attached to the closed end of the utility frame member 262 and braces 267 are attached between the utility frame member 262 and the utility base plate 266. Vertical tank mount 268 is attached to the utility frame member 262. A winch 270 is attached to the utility base plate 266 and a tool box 272 is attached to the utility frame member 262. Referring now to FIG. 9, a plan view of the hydraulic tilt tank trailer 100 is shown. The tilt chassis 200 is rotatably attached to the utility trailer 101. The tilt chassis frame 201 of the tilt chassis 200 is dimensioned to fit within the trailer bed 110 of the utility trailer 101. The tilt chassis frame 201, described in conjunction with FIG. 10, has a width 284 that is smaller than the width 104 of the trailer bed 110. Once inserted, the tilt chassis frame 201 fits within the first frame member 112, second frame member 114, and primary cross member 116 of the trailer bed 110 and rests on the first support member 113, the second support member 115, and the primary cross member 160 of the trailer bed 110.

The tilt chassis frame 201 has a length 282 which is longer than length 102 of the trailer bed 110, where the tilt chassis frame 201 extends a predetermined length 286 longer than the trailer bed 110. The length 282 of the tilt chassis frame 201 allows it to accommodate the size of the vertical tank 300. The additional length of the tilt chassis frame 201 provides the ability for the tilt chassis 200 to tilt relative to the utility trailer 101 to serve as a ramp for the vertical tank 300.

Figure 11:
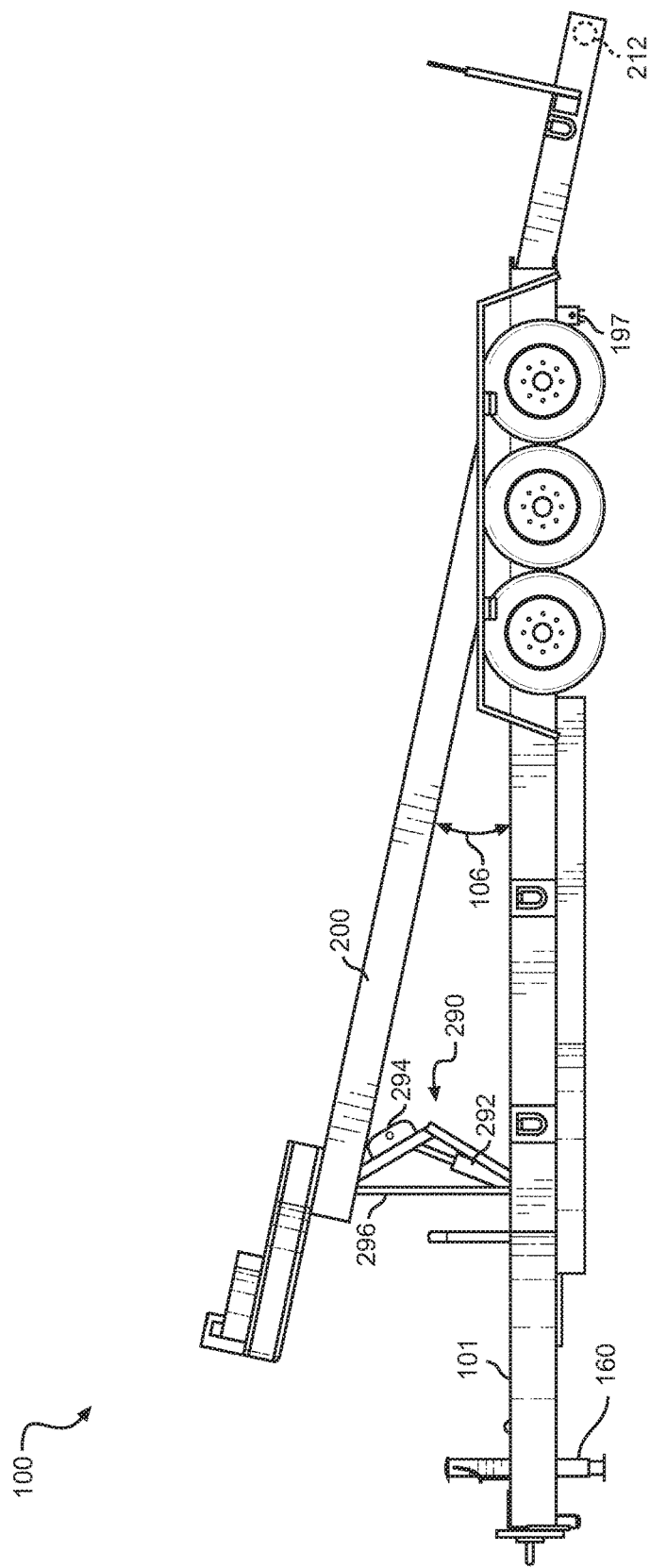
FIG. 11 is a side view of the hydraulic tilt tank trailer in the loading position.

Referring now to FIG. 11, a side view of the hydraulic tilt tank trailer 100 is shown with the tilt chassis 200 tilted into a loading position. To facilitate the tilting or rotation of the tilt chassis 200, a hydraulic lift system 290 is utilized. The hydraulic lift system 290 generally includes a hydraulic system 292 and a boom system 294. One end of the boom system 294 is connected to the first flange 172 and the second flange 174 of the primary support member 170 of the utility trailer 101 and the opposite end of the boom system 294 is connected to the front tilt chassis frame member 206 of the tilt chassis 200. One end of the hydraulic system 292 is connected to primary support member 170 with the opposite end connected to the boom system 294. The operation of the hydraulic system 292 may be manually controlled or may be electrically controlled. Safety bar 296 helps keep the tilt chassis 200 secured when rotated to loading/unloading angle 106.

Figure 11A:
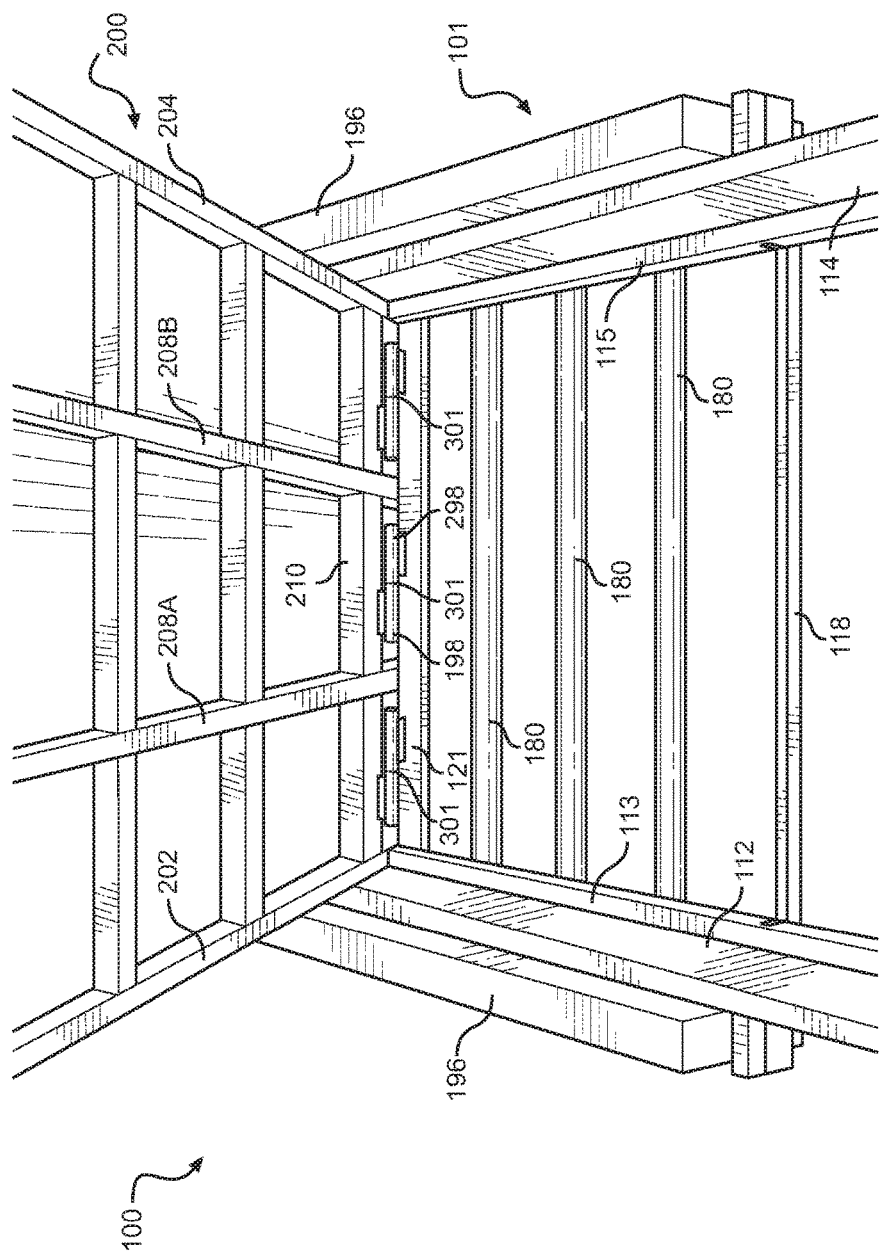
FIG. 11a is a close up view of the hinge assembles of the hydraulic tilt tank trailer.
Figure 12:
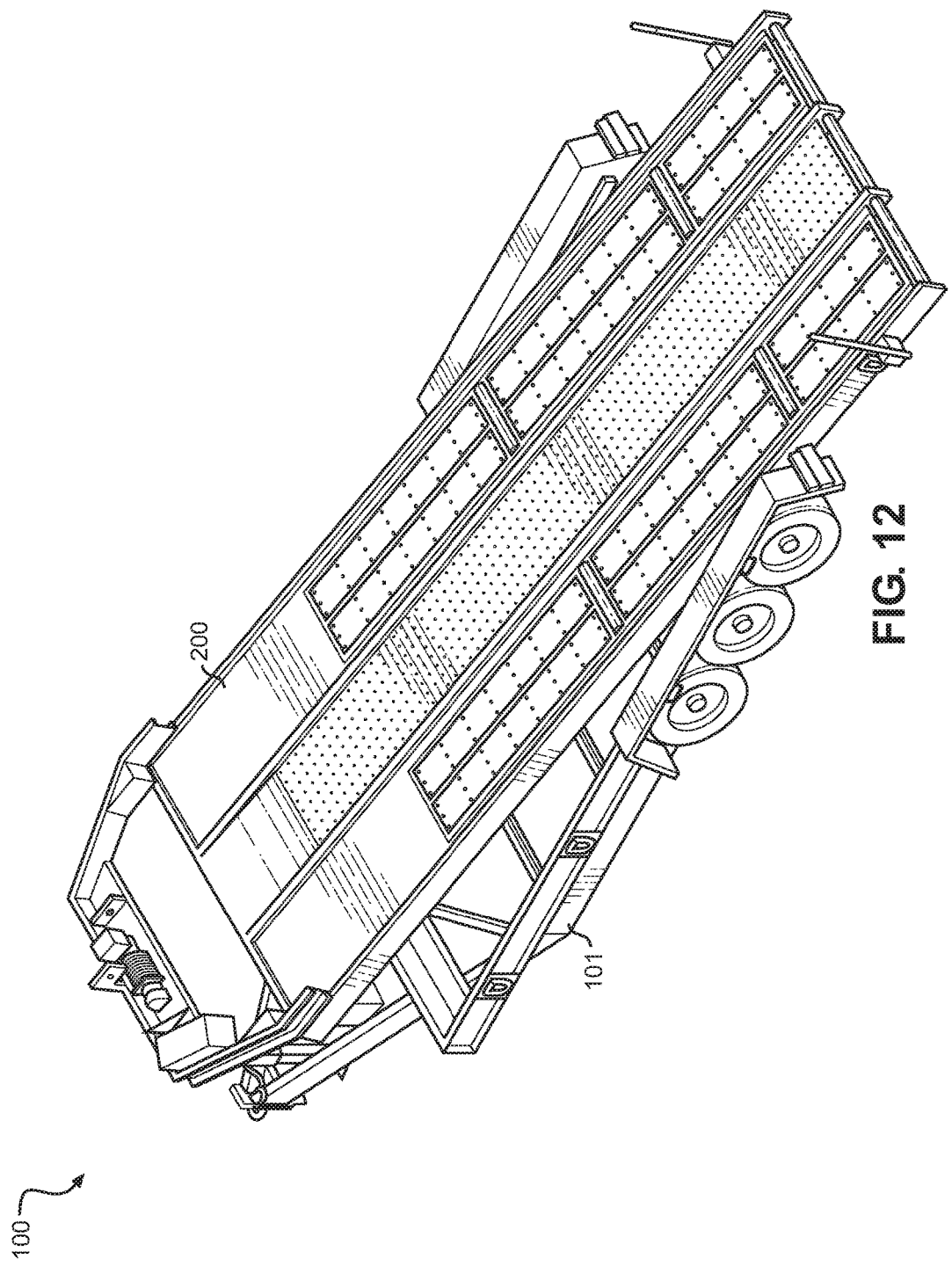
FIG. 12 is a rear perspective view of the hydraulic tilt tank trailer in the loading position.
Figure 13:
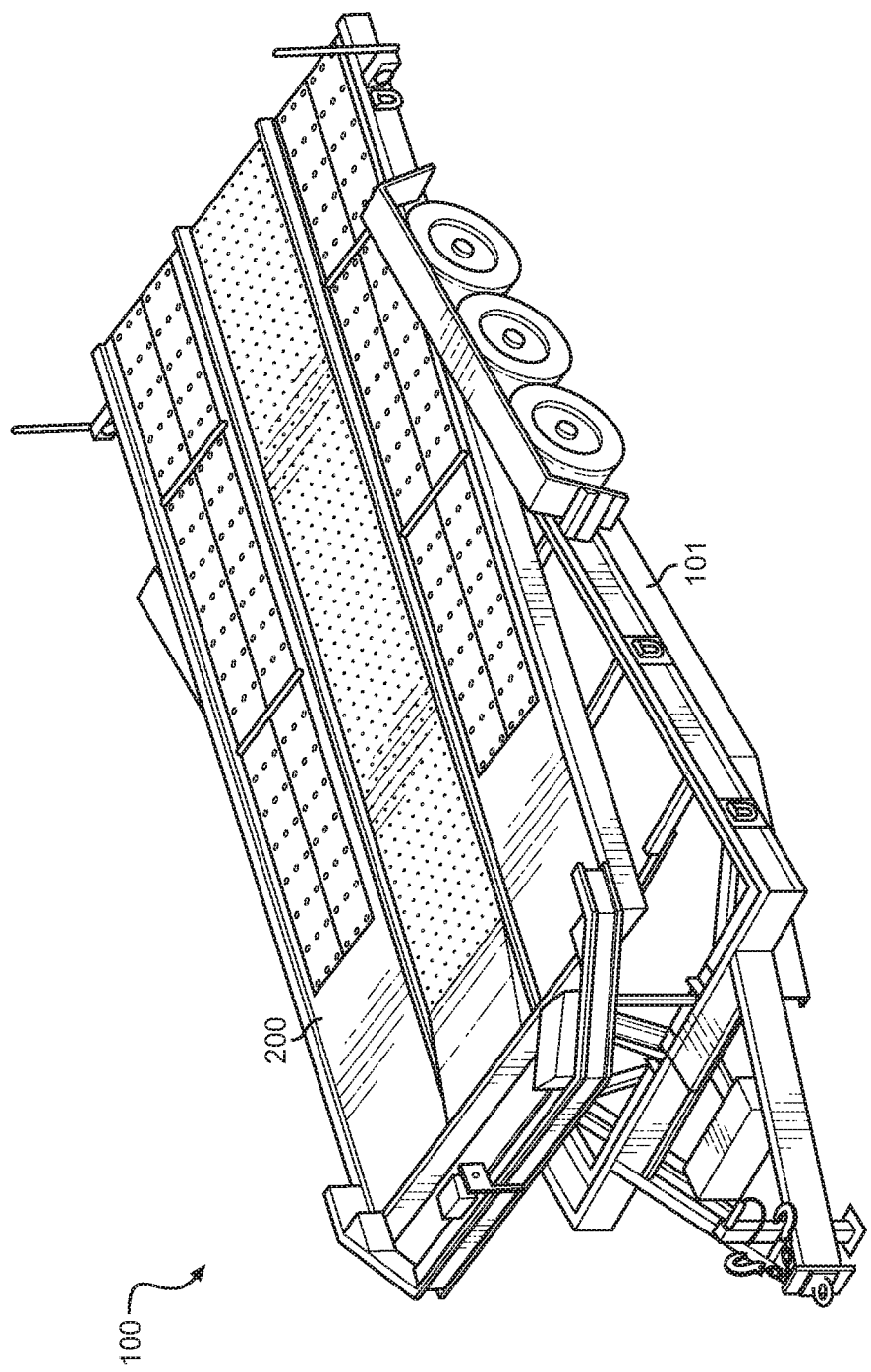
FIG. 13 is a front perspective view of the hydraulic tilt tank trailer in a loading position.

As shown in FIG. 11a, three hinge assemblies 301 rotatably attached the utility trailer 101 and the tilt chassis 200. The hinge assemblies 301 are a two-piece hinge assembly having a first hinge plate 198, a second hinge plate 298, and a pin 199 (not shown). The pin 199 connects the first hinge plate 198 and the second hinge plate 298 and provides an axis of rotation between the two hinge plates.

The hinge assemblies 301 rotatably attach the rear cross member 121 of the utility trailer 101 to the secondary tilt chassis cross member 210 of the tilt chassis 200, where the first hinge plate 198 is attached to the secondary tilt chassis cross member 210 and the second hinge plate 298 is attached to the rear cross member 121. Each of the three hinge assemblies 301 are positioned between the first tilt chassis frame member 202 and the longitudinal tilt chassis frame member 208A, between the pair of longitudinal tilt chassis frame members 208A and 208B, and between the second tilt chassis frame member 204 and the longitudinal tilt chassis frame members 208B, respectively. The utility trailer 101 and the tilt chassis 200 rotates relative to each other about the pin 199 of the hinge assemblies.

In an alternative embodiment, the rotatable attachment includes a shaft and a bearing. The bearing is attached to the tilt chassis 200 and the shaft is attached to the utility trailer 101 between the right frame member 112 and left frame member 114, above the axles 180. The shaft is inserted through the bearing, which allows the bearing to rotate about the shaft. This allows the tilt chassis 200 to rotate about the shaft attached to the utility trailer 101.

In another alternative embodiment, the rotatable attachment may include a shaft and a sleeve, where the shaft is inserted into the sleeve forming a sleeve type bearing, which allows the sleeve to rotate about the shaft. The sleeve will be attached to the tilt chassis 200 and the shaft is attached to the utility trailer 101 between the right frame member 112 and left frame member 114, above the axles 180. This allows tilt chassis 200 to rotate about the shaft attached to the utility trailer 101. The rotatable attachment is not meant to be limiting, and it is contemplated that other means for rotation is contemplated without departing from the spirit and scope of the invention.

As shown in FIGS. 11, 11a, 12, and 13, the tilt chassis 200 can tilt, or rotate, until the main rollers 212 contact the surface of the ground. In the preferred embodiment, this tilting or rotation allows the tilt chassis 200 to rotate between 0° and 11° with respect to the trailer bed 110 to a loading/unloading angle 106 for loading/unloading the vertical tank 300 onto the tilt chassis 200. The degrees of rotation are not meant to be limiting, and it is contemplated that the degrees of rotation of the tilt chassis may be more or less. It is contemplated that the extension of the length 282 of the tilt chassis frame 201 may be changed to meet the needs of the hydraulic tilt tank trailer 100. The longer the tilt chassis frame 201 extends pass the utility trailer 101, the smaller the degree of rotation the tilt chassis 200 will have, and vice versa.

Tank

Figure 14:
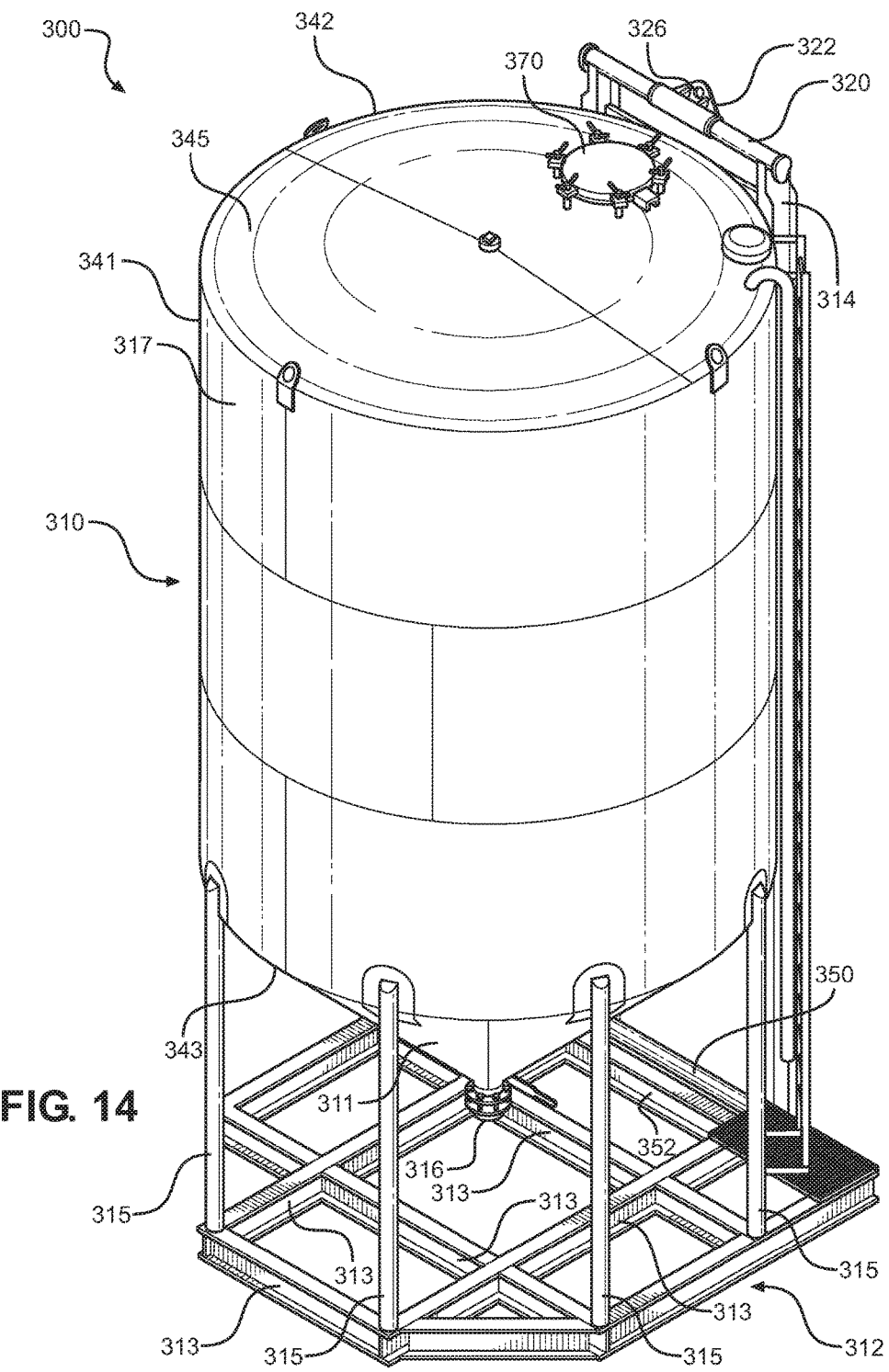
FIG. 14 is a perspective view of the vertical tank.
Figure 15:
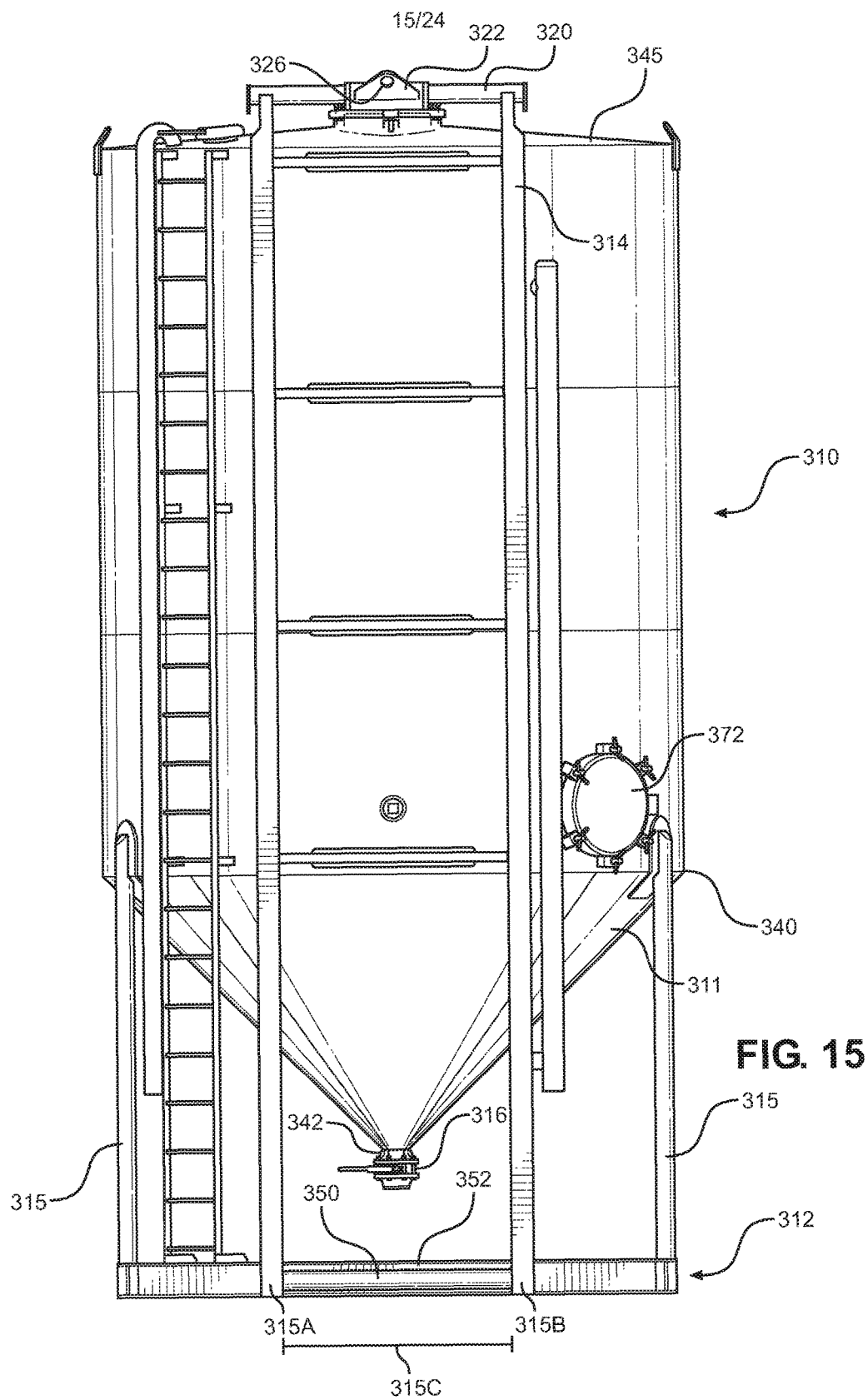
FIG. 15 is a back view of the vertical tank showing the sled frame.
Figure 16:
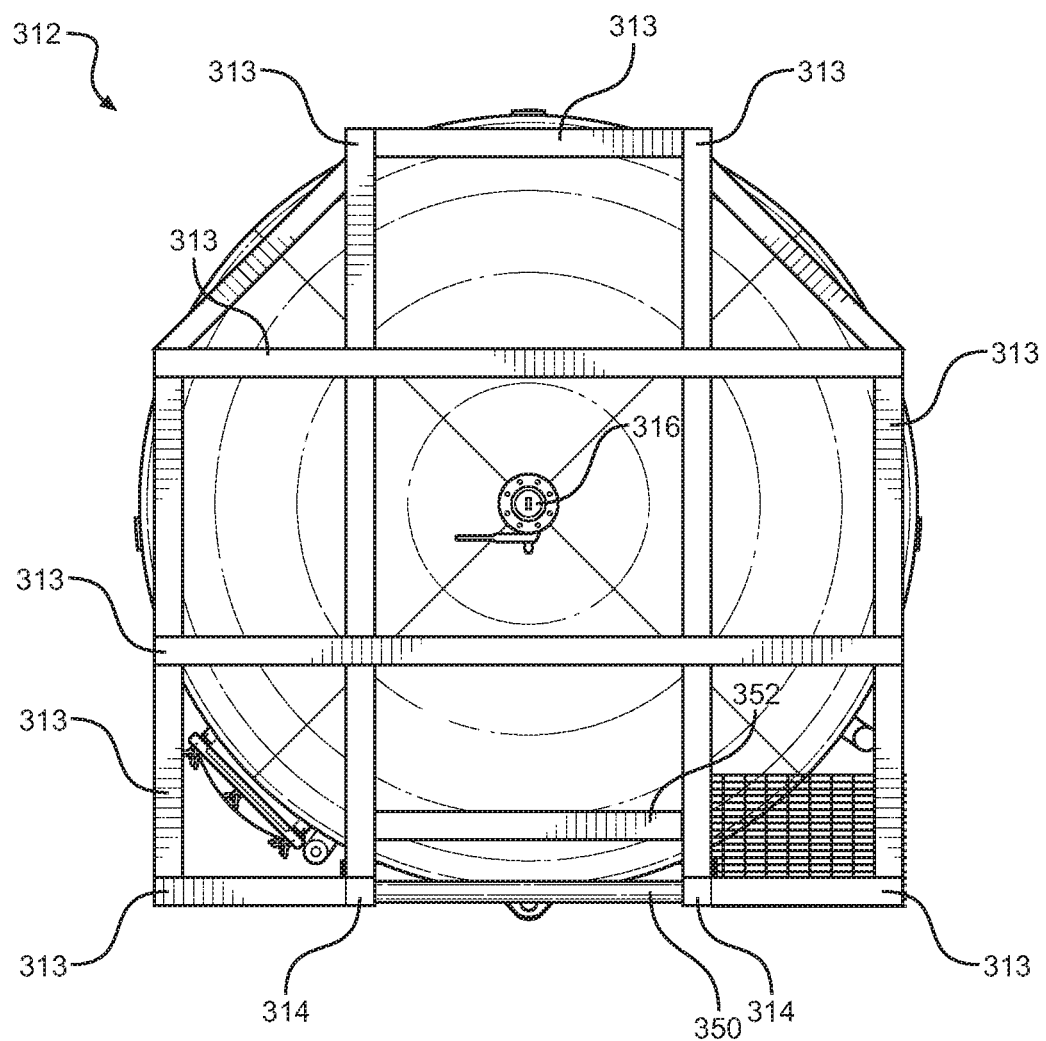
FIG. 16 is a bottom view of the vertical tank showing the base frame.

Referring next to FIG. 14, a perspective view of the vertical tank 300 is shown. The tank 300 includes a large hollow body 310 for holding materials such as water, drilling mud, or drilling wastes. As shown in FIG. 14, in conjunction with FIGS. 15 and 16, the hollow body 310 consists of a cylindrical wall 317, a conical bottom 311, a top panel 345 and a lower valve 316. The cylindrical wall has a top 341, a bottom 343 and a circumference 342. The top panel 345 is connected with and encloses the top 341 of the cylindrical wall 317. A top access door 370 allows for access through the top panel 345 to examine the contents held within tank 300. The conical bottom 311 tapers from a top portion 340 to a bottom portion. The top portion 340 of the conical bottom 311 is generally the same circumference 342 as the circumference 342 of the cylindrical wall 317 and is connected to the bottom 343 of the cylindrical wall 317. The bottom portion 342 of the conical bottom is enclosed by the lower valve 316.

The conical bottom 311 facilitates the flow of materials out of the tank 300 through the lower valve 316. The lower valve 316 is connected to the bottom portion 342 of the conical bottom 311 such that the lower valve 316 can be opened to allow fluid or other materials stored in the tank 300 to pass out of the tank 300 through the lower valve 316. When in a vertical position, the lower valve 316 is above the base frame 312 to allow for ease of connecting various plumbing fixtures to the lower valve 316 when the tank 300 is in use.

In a preferred embodiment, the tank 300 has a base frame 312 and a sled frame 314. For a vertical tank 310, the base frame 312 is located on the bottom of the tank 300 and the sled frame 314 runs along the cylindrical wall 317 of the tank 300, terminating in a tank lifting bar 320 opposite the base frame 312. The base frame 312 includes base frame members 313 and the sled frame 314 includes sled frame members 315A and 315B. In a preferred embodiment, the base frame members 313 and sled frame members 315A and 315B are made of steel members configured with I-beam cross sections. The I-beam cross sections increase the structural rigidity of the base frame members 313 to allow the base frame 312 to support the entire weight of the tank 300. The sled frame 314 is sufficiently rigid to serve as the primary structure support for the tank 300 when the tank 300 is tilted and laid on the sled frame 314. The sled frames members 315A and 315B are spaced a distance 315C apart and provides the main contact surface with the tilt chassis 200 when the vertical tank 300 is pulled onto the tilt chassis 200 for transportation. Distance 315C is wider than the distance between the longitudinal tilt chassis frame members 208A and 208B so the sled frame members 315A and 315B to contact the intermediary rollers 240 and skid plates 230. In an alternative embodiment, the sled frame 314 may be removably attached and replaced once the sled frame 314 is damaged due to wear and tear, as the sled frame 314 is the primary contact when loading/unloading the vertical tank 300.

Support members 315 are secured between the bottom 343 of the cylindrical wall 317 and the base frame members 313 of the base frame 312. The support members 315 hold the hollow body 300 in place above the base frame 312 and serve to further increase the structural rigidity of the base frame 312.

The tank lifting bar 320 holds a lifting line panel 322 that can rotate with respect to the tank lifting bar 320. A winch line from winch 270 may be connected to the lifting line panel 322 via a lifting line panel hole 326 on the lifting line panel 322 by any means known in the art. In a preferred embodiment, one end of the winch line of the winch 270 is passed through the lifting line panel hole 326 and formed into a loop and secured against itself by any means known in the art, including clamp, hook, clasp or other temporary fastener or a permanent bond such as welding. A side access door 372 is connected to the cylindrical wall 317 of the tank 300 in order to allow access to the interior of the tank 300 to facilitate cleaning or debris removal.

The tank base frame 312 includes a plurality of rigid structural base frame members 313, including a tank base first bar 350 and a tank base second bar 352. The tank base first bar 350, made of cylindrical tubing, is parallel to the tank base second bar 352, made of square tubing, and both the tank base first bar 350 and the tank base second bar 352 are rigidly incorporated into the tank base frame 312. It is contemplated that, the tank base second bar 352 can also be made of cylindrical tubing.

In an alternative embodiment, the tank base frame 312 includes only a plurality of rigid structural base frame members 313, and does not include the tank base first bar 350 and the tank base second bar 352. Instead, a base frame member 313 replaces the tank base first bar 350.

Method of Transporting a Tank

Referring now to FIGS. 17-26, a method of transporting the tank 300 utilizing the hydraulic tilt tank trailer 100 and a truck 20 is shown. FIGS. 17-22 shows the process of loading the vertical tank 300 onto the hydraulic tilt tank trailer 100. Once loaded the hydraulic tilt tank trailer 100 with the loaded vertical tank 300 may be towed with the truck 20. FIGS. 23-26 shows the process of unloading the vertical tank 300 from the hydraulic tilt tank trailer 100. As shown in the figures, the hydraulic tilt tank trailer 100 is utilized to load the vertical tank 200 without the truck 20. It is contemplated that the method of loading the vertical tank 300 from the hydraulic tilt tank trailer 100 may be performed with the truck 20 attached to the hydraulic tilt tank trailer 100 without departing from the spirit and scope of the invention.

Figure 17:
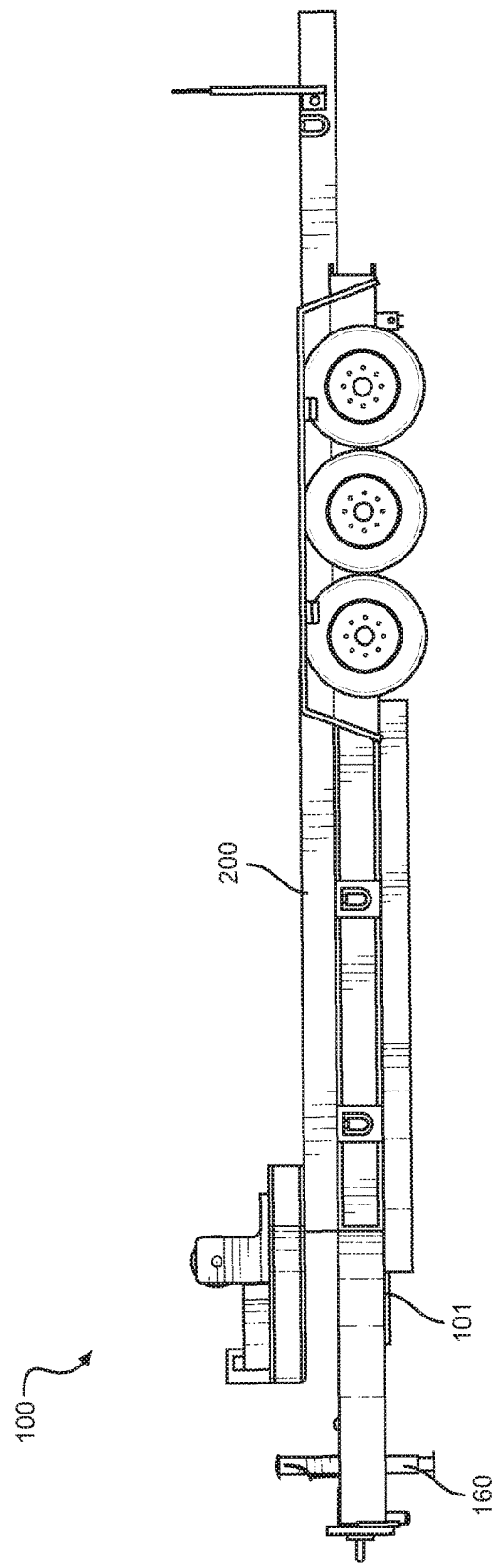
FIG. 17 is a side view of the hydraulic tilt tank trailer with the tilt chassis in the towing position.

As shown in FIG. 17, the hydraulic tilt tank trailer 100 is parked without the truck 20 next to the vertical tank 300 to be transported. The tilt chassis 200 is in the towing position where the angle 106 of the tilt chassis 200 is at 0° and the tilt chassis 200 is parallel with the utility trailer 101. The hitch jack 162 is extended to the ground to elevate the front end of the hydraulic tilt tank trailer 100 so that it is even with the ground.

Figure 18:
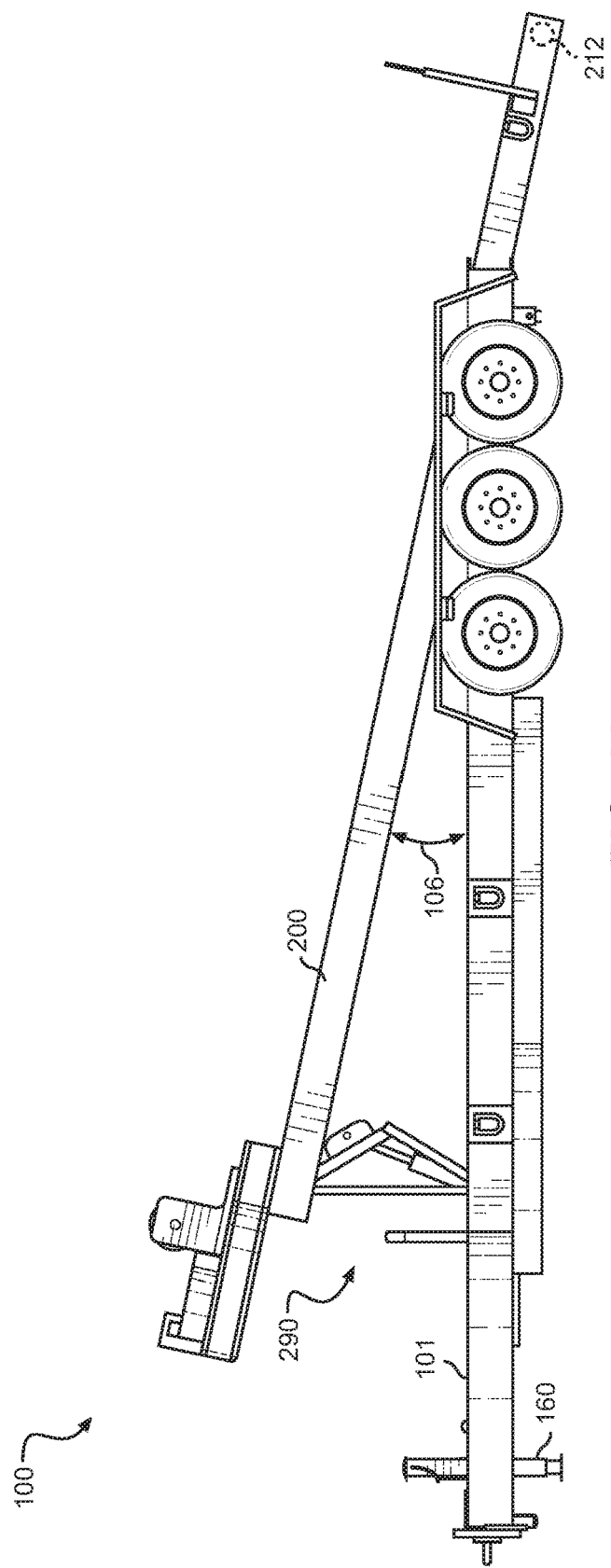
FIG. 18 is a side view of the hydraulic tilt tank trailer with the tilt chassis in the loading/unloading position.

As shown in FIG. 18, the hydraulic lift system 290 is then activated by a user to lift the front end of the tilt chassis 200. This rotates the tilt chassis 200 about the connection point between the tilt chassis and the utility trailer 101 until the main rollers 212 contact the ground. Once the main rollers 212 contact the ground, the hydraulic lift system 290 is stopped, which stops the tilt chassis 200 at angle 106.

Figure 19:
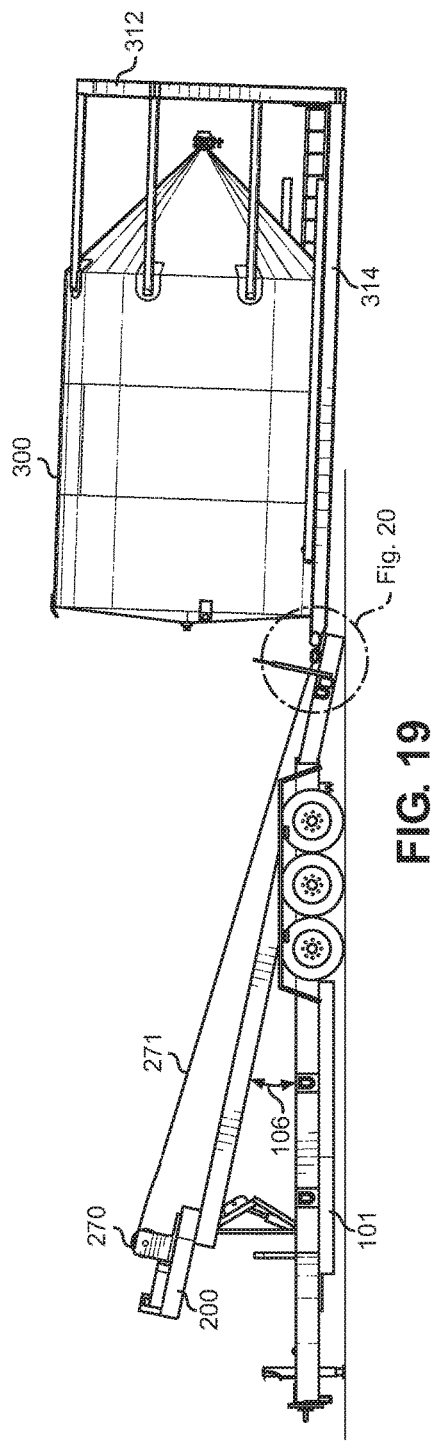
FIG. 19 is a side view of the hydraulic tilt tank trailer with the tilt chassis in the loading/unloading position showing the vertical tank in the process of being loaded onto the tilt chassis.
Figure 20:
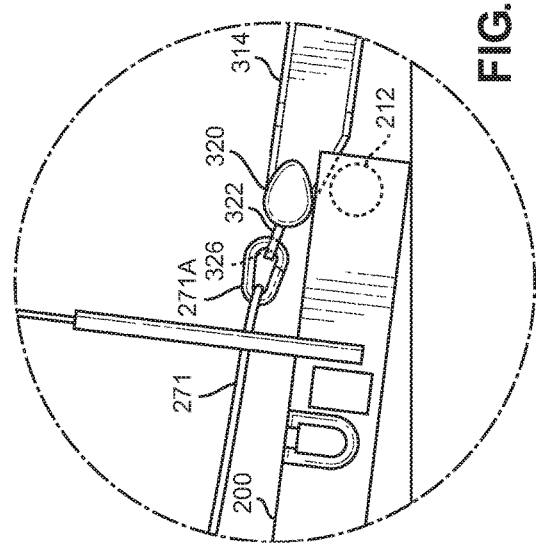
FIG. 20 is a close-up view of the tank lifting bar of the vertical tank contacting the main rollers of the tilt chassis.

As shown in FIG. 19, in conjunction with FIG. 20, the next step is to attach a fastener 271A from winch wire 271 of the winch 270 to the lifting line panel hole 326 on the lifting line panel 322. The winch wire 271 of the winch 270 is then retracted back to the winch 270, which pulls the attached vertical tank 300. Due to the front edge of the sled frame members 315A and 315B being tapered in conjunction with the tank lifting bar 320 being slightly elevated above center, the tank lifting bar 320 of the sled frame 314 contacts the main rollers 212 of the tilt chassis 200 above center when the vertical tank 300 is being pulled. This causes the tank lifting bar 320 to roll above the main rollers 212 and as the vertical tank 300 is being pulled further, the tapered edges of the sled frame members 315A and 315B also come into contact with the main rollers 212, which eventually rolls the sled frame members 315A and 315B above the main rollers 212.

When pulling the vertical tank 300 onto the tilt chassis 200, the sled frame 314 is the only part of the vertical tank 300 that contacts the tilt chassis 200. As the vertical tank 300 is pulled up, the sled frame 314 contacts the intermediary rollers 240 and skid plates 230. The intermediary rollers 240 are positioned wherein the top surface of the intermediary rollers 240 are above the top surface of the skid plates 230. The intermediary rollers 240 provide a point of contact for the sled frame 314. This minimizes the friction acting on the vertical tank 300 as it is pulled onto the tilt chassis 200. In instances where the vertical tank 300 may tilt slightly, such as when the vertical tank is only in contact with one set of intermediary rollers 240, the skid plates 230 provide a low-friction surface that allows the vertical tank 300 to skid along until it contacts another set of intermediary rollers 240. When fully mounted, the sled frame 314 of the vertical tank 300 is in contact with only the intermediary rollers 240. First guide rail 250A and second guide rail 250B provides bumpers that center the vertical tank 300 along the tilt chassis 200 as it is pulled onto the trailer as well as to prevent damage to the tilt chassis 200.

As shown in FIG. 21, after the tank lifting bar 320 and the tapered edge of the sled frame members 315A and 315B are pulled pass the main rollers 212, the vertical tank 300 is pulled completely onto the tilt chassis 200.

Figure 23:
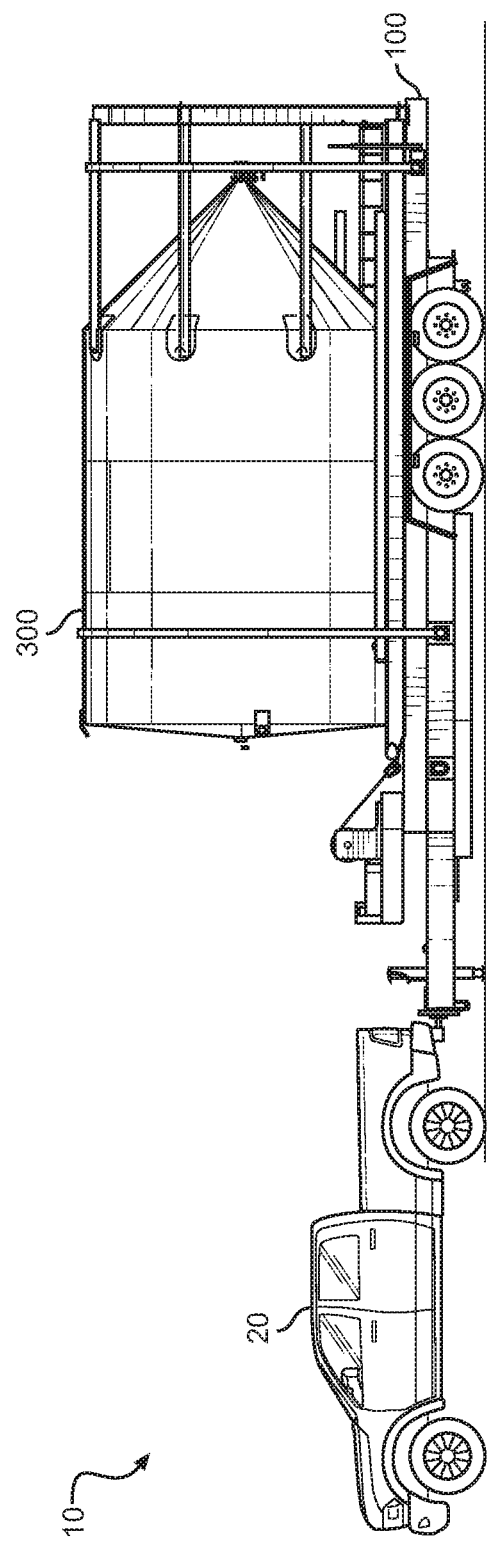
FIG. 23 is a side view of the truck hitched to the hydraulic tilt tank trailer with the vertical tank loaded onto the tilt chassis in the towing position.

As shown in FIG. 22, after the vertical tank 300 is completely on the tilt chassis 200, the tilt chassis 200 is tilted back into the towing position. The vertical tank 300 is then secured to the hydraulic tilt tank trailer 100 through the use of D-rings 189 and straps, or other methods known in the art. The truck 20, shown in FIG. 23, is then attached to the tow ring 150 of the hydraulic tilt tank trailer 100 and is ready to be towed. Once the truck 20 with hydraulic tilt tank trailer 100 and vertical tank 300 reaches the destination for the vertical tank, the vertical tank 300 may be unloaded.

Figure 24:
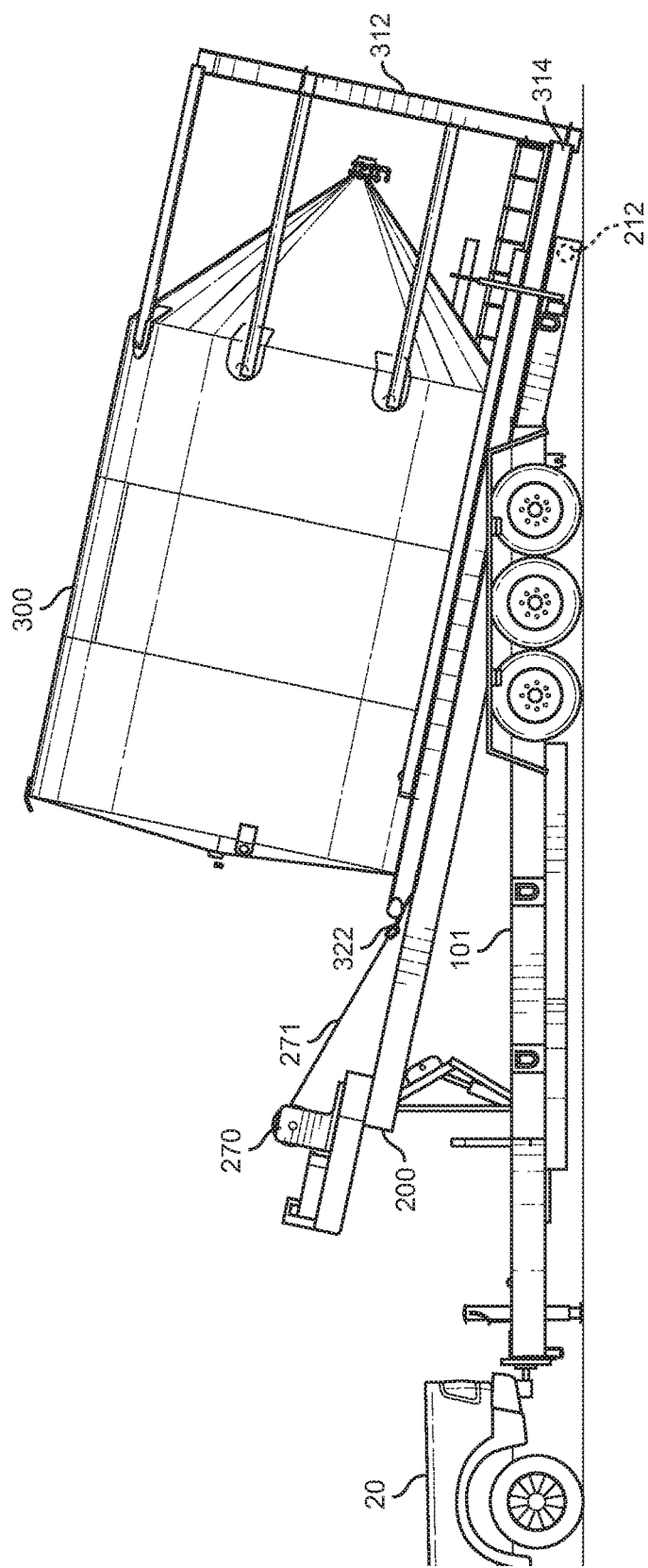
FIG. 24 is a side view of the truck hitched to the hydraulic tilt tank trailer with the vertical tank loaded onto the tilt chassis in the loading/unloading position.

As shown in FIG. 24, to unload the vertical tank 300 from the hydraulic tilt tank trailer 100 all of the straps used, or other securing means, are removed. The winch wire 271 and fastener 271A remains attached to the vertical tank 300. The tilt chassis 200 is then tilted until the main rollers 212 contact the floor. Once the main rollers 212 contact the floor, the winch 270 is slowly released and the vertical tank 300 begins to slide off of the tilt chassis 200 until the base frame 312 and sled frame 314 contact the floor. The winch wire 271 and fastener 271A may be removed from the vertical tank 300 or may be left on until the vertical tank 300 is completely off the hydraulic tilt tank trailer 100.

Figure 25:
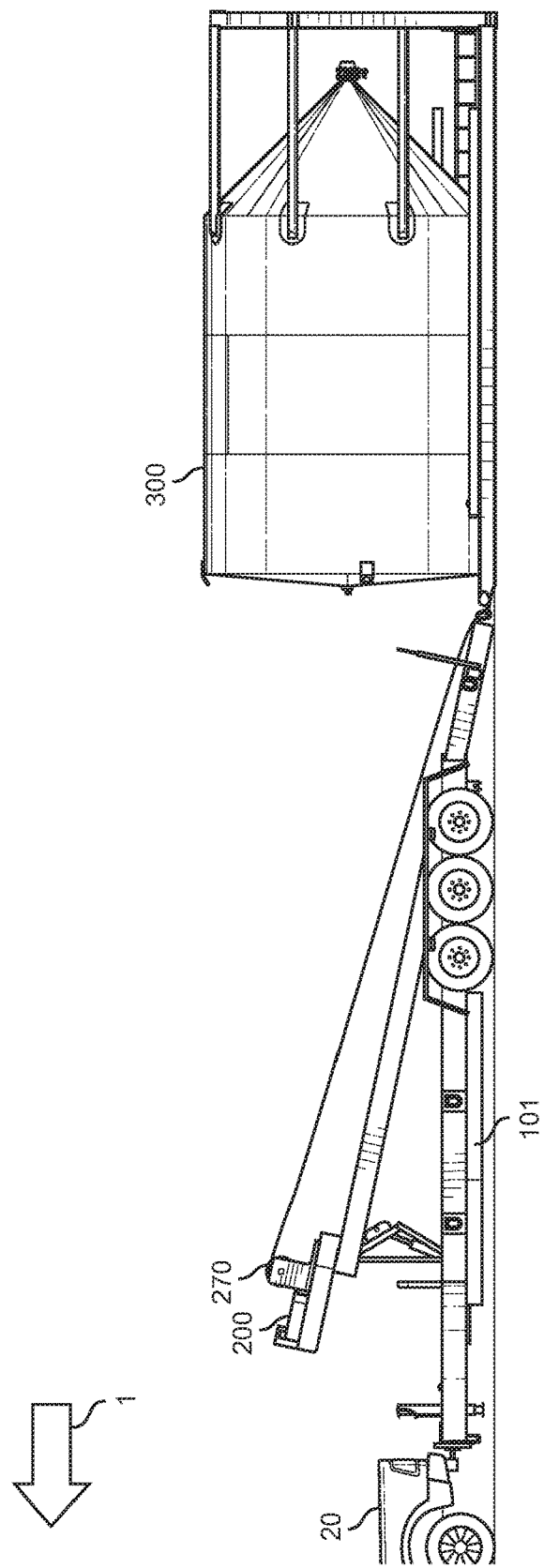
FIG. 25 is a side view of the truck hitched to the hydraulic tilt tank trailer with the vertical tank unloaded from the tilt chassis in the loading/unloading position.
Figure 26:
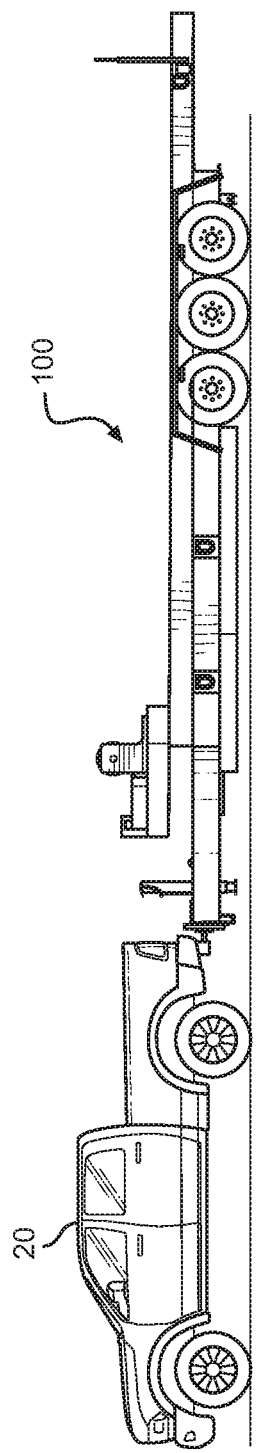
FIG. 26 is a side view of the truck hitched to the hydraulic tilt tank trailer with the tilt chassis in the towing position.

As shown in FIG. 25, after the base frame 312 and sled frame 314 of the vertical tank contacts the floor, the hydraulic tilt tank trailer 100 is towed forward in direction 1. The weight of the vertical tank 300 provides enough traction with the ground that the vertical tank 300 is not pulled along with the hydraulic tilt tank trailer 100 when towed in direction 1. The hydraulic tilt tank trailer 100 is pulled from under the vertical tank 300, unloading the vertical tank 300 in on the ground to be used. After unloading the vertical tank 300, the winch wire 271 is retracted and the tilt chassis 200 is tilted back to the towing position as shown in FIG. 26.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

While there have been shown what are presently considered to be preferred embodiments of the present invention, it will be apparent to those skilled in the art that various changes and modifications can be made herein without departing from the scope and spirit of the invention. Accordingly, the invention is not to be limited as except by the appended claims.

The invention claimed is:

1. A tilt tank trailer comprising:
 a utility trailer having
  a trailer bed with a first frame member and a second frame member, each having a first end and a second end, wherein a primary cross member is connected to said first end of said first frame member and to said second end of said second frame member thereby forming a u-shape with an inner surface;
  a support platform formed adjacently to and disposed within said u-shape of said trailer bed frame, said support platform including a first support member attached to said first frame member, a second support member attached to said second frame member, and a primary support member attached to said primary cross member wherein said first support member, said second support member and said primary support member form an edge along said inner surface of said u-shape of said trailer bed frame;
  a rear cross member connected to said second end of said first frame member and to said second end of said second frame member;
  at least one axle connected to said utility trailer and at least two wheels connected to said at least one axle; and
  a tilt chassis rotatably connected to said utility trailer wherein said tilt chassis rotates from a tow position parallel to said utility trailer to a loading/unloading angle with respect to said utility trailer wherein said tilt chassis has a tilt chassis frame that rests on said edge of said first support member, said second support member and said primary support member within said u-shape of said trailer bed when in said tow position.

2. The trailer of claim 1 wherein said tilt chassis further comprises one or more main rollers attached at said rear of said tilt chassis.

3. The trailer of claim 2, wherein said tilt chassis further comprises a left steel plate and a right steel plate, said left steel plate and said right steel plate each having one or more intermediary rollers.

4. The trailer of claim 3, wherein said tilt chassis further comprises a plurality of columns of skid plates on said left steel plate and said right steel plate wherein each of said one or more intermediary rollers is placed in between said columns of skid plates on said left steel plate and said columns of skid plates on said right steel plate.

5. The trailer of claim 1, further comprising a hydraulic lift system attached to said utility trailer and said tilt chassis, wherein said hydraulic lift system lifts said tilt chassis about said rear cross member of said utility trailer.

6. A method for transporting tanks, comprising the steps of:
 providing a tilt tank trailer having
  a utility trailer having
   a trailer bed with a trailer bed frame having a first frame member and a second frame member, each having a first end and a second end, wherein a primary cross member is connected to said first end of said first frame member and to said second end of said second frame member thereby forming a u-shape with an inner surface;
   a support platform formed adjacently to and disposed within said u-shape of said trailer bed frame, said support platform including a first support member attached to said first frame member, a second support member attached to said second frame member, and a primary support member attached to said primary cross member wherein said first support member, said second support member and said primary support member form an edge along said inner surface of said u-shape of said trailer bed frame; and a rear cross member connected to said second end of said first frame member and to said second end of said second frame member, at least one axle connected to said utility trailer and at least two wheels connected to said at least one axle;

a tilt chassis rotatably connected to said utility trailer wherein said tilt chassis rotates from a tow position parallel to said utility trailer to a loading/unloading angle with respect to said utility trailer wherein said tilt chassis has a tilt chassis frame that rests on said edge of said first support member, said second support member and said primary support member within said u-shape of said trailer bed when in said tow position;

Providing a vertical tank having a base frame located on a bottom of said vertical tank and a sled frame connected to said base frame and running along a cylindrical wall of said vertical tank wherein said sled frame is sized to slidably fit on said tilt chassis of said utility trailer and wherein said vertical tank rests on said base frame when in use;

Providing a tow vehicle connected to said tilt tank trailer;

Rotating said tilt chassis to said loading/unloading angle;

Moving said tank onto said tilt chassis until said sled frame of said tank rests entirely on said tilt chassis;

Rotating said tilt chassis to said tow position;

Using said tow vehicle to tow said tilt tank trailer and said vertical tank to a destination;

Rotating said tilt chassis to said loading/unloading angle;

Moving said tank from said tilt chassis until said sled frame of said tank rests entirely on said ground; and Raising said tank until said base frame of said tank rests on said ground.

7. The method of claim 6 wherein said tilt chassis further comprises one or more main rollers at said rear of said tilt chassis.

8. The method of claim 7, wherein said tilt chassis further comprises one or more intermediary rollers.

9. The method of claim 8, wherein said tilt chassis further comprises skid plates.

10. The method of claim 9, wherein said tilt chassis has a winch further comprising the steps of using said winch to move said tank on said tilt chassis.

* * * * *